(12) United States Patent
Bowley et al.

(10) Patent No.: US 6,538,775 B1
(45) Date of Patent: Mar. 25, 2003

(54) HOLOGRAPHICALLY-FORMED POLYMER DISPERSED LIQUID CRYSTALS WITH MULTIPLE GRATINGS

(75) Inventors: Christopher C. Bowley, Woodbury, MN (US); Adam K. Fontecchio, Medfield, MA (US); Jaujeng Lin, Yorktown Heights, NY (US); Gregory P. Crawford, Providence, RI (US); Sadeg M. Faris, Pleasantville, NY (US); Le Li, Yorktown Heights, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/398,964

(22) Filed: Sep. 16, 1999

(51) Int. Cl.⁷ .................................................. G03H 1/02
(52) U.S. Cl. ............................... 359/3; 359/15; 359/22; 359/24; 359/618; 359/634; 349/74; 349/86; 349/92; 349/115; 349/201; 353/30; 353/31
(58) Field of Search ............................. 349/115, 74, 86, 349/92, 201; 359/3, 15, 22, 24, 618, 634; 353/30, 31

(56) References Cited

U.S. PATENT DOCUMENTS 5,668,614 A * 9/1997 Chien et al. ................. 349/115
5,748,012 A 5/1998 Tanaka et al.

(List continued on next page.)

OTHER PUBLICATIONS

Bowley et al., "Electro–Optic Investigations of H–PDLCs: The Effect of Monomer Functionality of Display Performance" SID, '99 Digest of Technical Papers, pp. 958–961, (May, 1999).

Bowley et al., "Advances in Holographic Polymer Dispersed Liquid Crystal Technology" Materials Research Society, vol. 559, (May, 1999).

Bunning, et al., "The Morphology and Performance of holographic transmission gratings recorded in polymer dispersed liquid crystals" Polymer, vol. 36, No. 14, pp. 2699–2708 (1995).

Date et al., "Three–Primary–Color Holographic Polymer Dispersed Liquid Crystal (HPDLC) Devices for Reflective Displays".

(List continued on next page.)

*Primary Examiner*—Audrey Chang
*Assistant Examiner*—Craig Curtis
(74) *Attorney, Agent, or Firm*—Hale & Dorr, LLP; Mary Rose Scozzafava

(57) ABSTRACT

A multicolored reflection liquid crystal display device includes a pair of substrates having a reflective holographic polymer dispersed liquid crystal (H-PDLC) film disposed therebetween. The H-PDLC film contains at least two different reflection gratings capable of reflecting two different wavelengths of light. A multicolored reflection H-PDLC is obtained by simultaneously illuminating a plurality of regions of a film comprised of a mixture of a liquid crystal and a photo-polymerizable monomer with a plurality of holographic light patterns capable of providing liquid crystal layers of different spacings so as to obtain different reflection gratings in each of the regions. A mask is placed between each of the laser light beams and the film to form a pattern of light and dark regions on the film. Each mask is positioned such that at least one light region of a first beam pair coincides with at least one dark region of a second beam pair within the film. A multiple grating liquid crystal display device including an H-PDLC film having a first region comprising liquid crystal and matrix polymer layers forming a transmission grating and a second region comprising liquid crystal and matrix polymer layers forming a reflection grating capable of reflecting a preselected wavelength of light also is described.

11 Claims, 19 Drawing Sheets

U.S. PATENT DOCUMENTS

| | | | | |
|---|---|---|---|---|
| 5,748,272 A | * | 5/1998 | Tanaka et al. | 349/86 |
| 5,812,229 A | | 9/1998 | Chen et al. | |
| 5,875,012 A | * | 2/1999 | Crawford et al. | 349/74 |
| 6,166,800 A | * | 12/2000 | Silverstein et al. | 349/201 |

OTHER PUBLICATIONS

Fontecchio et al., "Improvement in Holographically–formed Polymer Dispersed Liquid Crystal Performance through Acrylated Monomer Functionality Studies" SPIE, vol. 3008, pp. 36–44, (Jul., 1999).

Kato, et al., "Reflective Liquid Crystal Color Display Technologies" Electronics and Communications in Japan, Part 2, vol. 81, No. 8, pp. 127–134, (Mar., 1998).

Sutherland, et al., "Bragg Gratings in an Acrylate Polymer Consisting of Periodic Polymer–Dispersed Liquid–Crystal Planes" Chem. Mater., 5, pp. 1533–1538 (1993).

Tanaka, et al., "A liquid–crystal/polymer optical device formed by holography for reflective color display applications" SID International Symposium Digest of Technical Papers, vol. 24, pp. 109–111 (1993).

Tanaka et al., "Fabrication of Holographic Polymer Dispersed Liquid Crystal (HPDLC) with High Reflection Efficiency" Jpn. J. Appl. Phys. vol. 38, pp. L277–L278 (1999).

Tanaka et al., "Holographically formed liquid–crystal/polymer device for reflective color display" Jrn. SID, 2:1 (1994).

Tanaka et al., "Optimization of Holographic PCLC for Reflective Color Display Applications" SID '95 Digest, pp. 267–270, (1995).

* cited by examiner

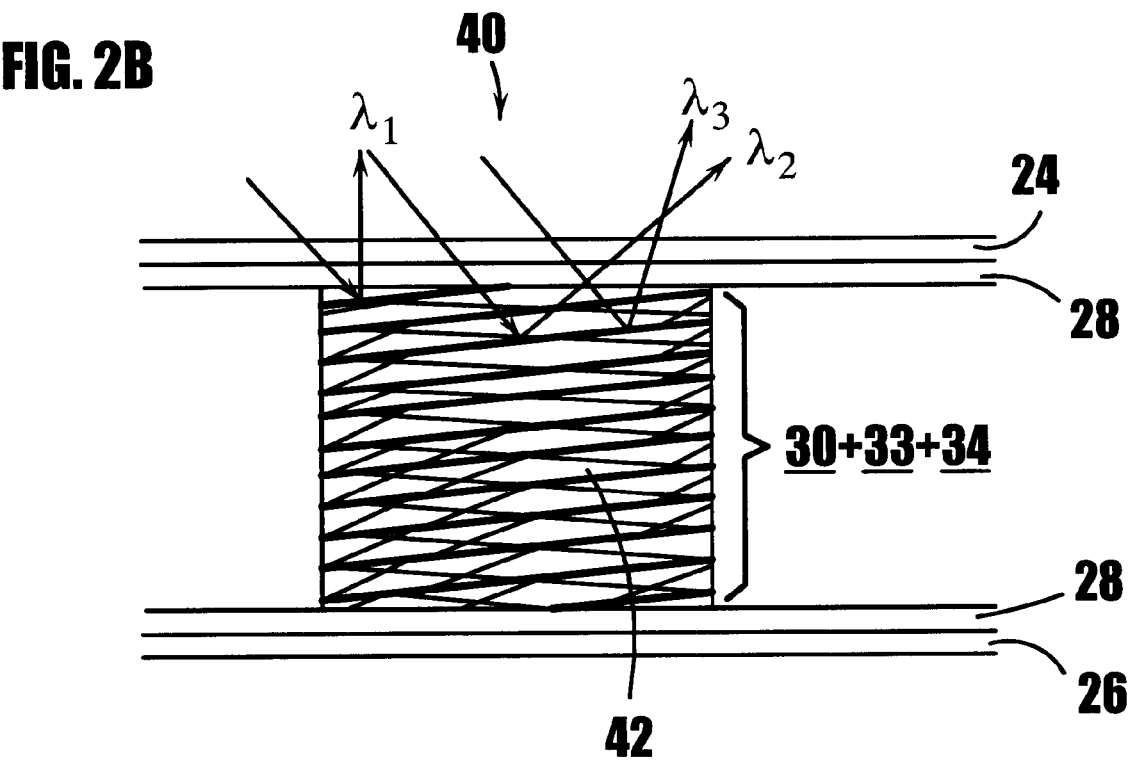

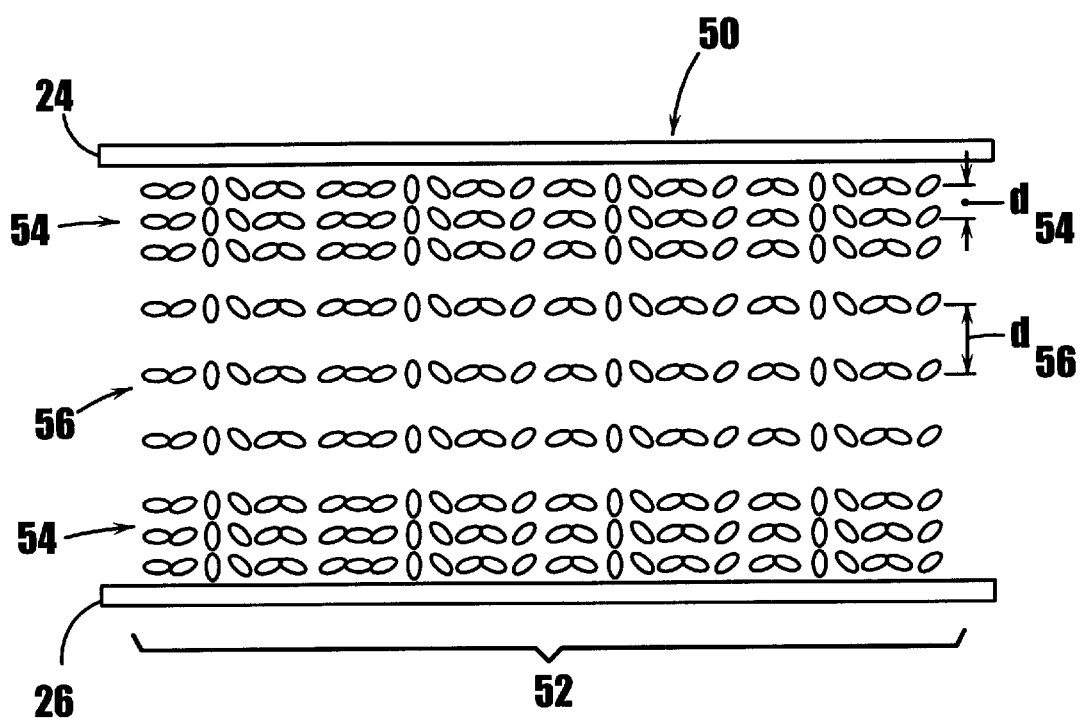

| 30 | 33 | 34 |
|---|---|---|
| 33 | 34 | 30 |
| 34 | 30 | 33 |

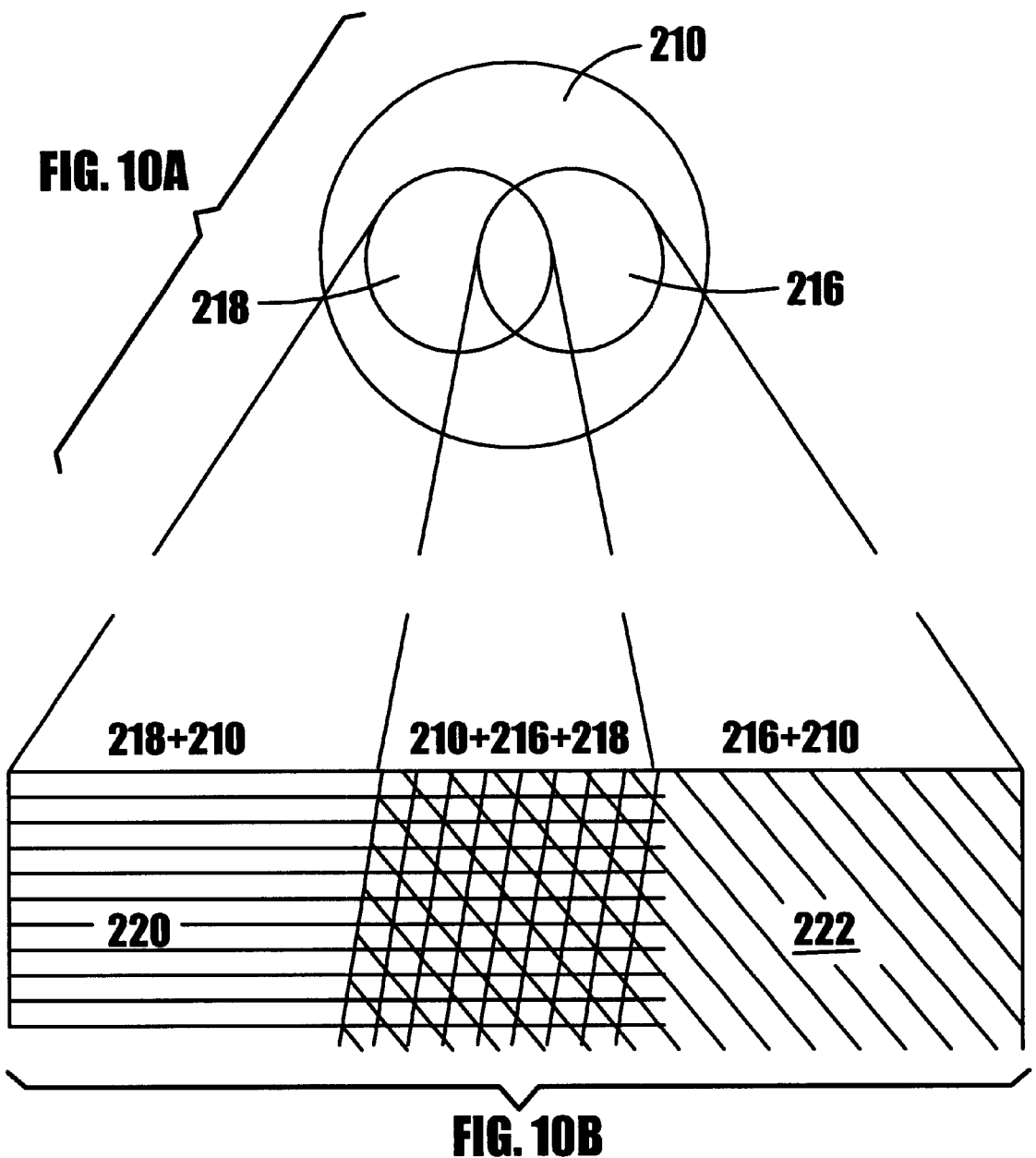

(a)    (b)

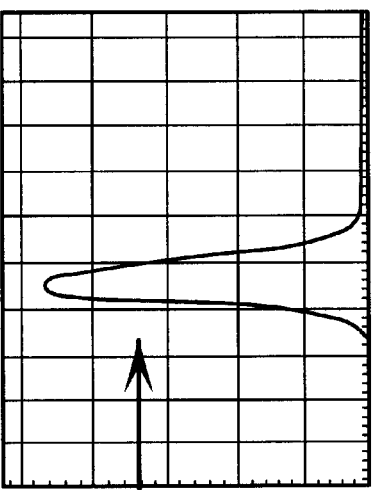
FIG. 18B
23% at 468 nm
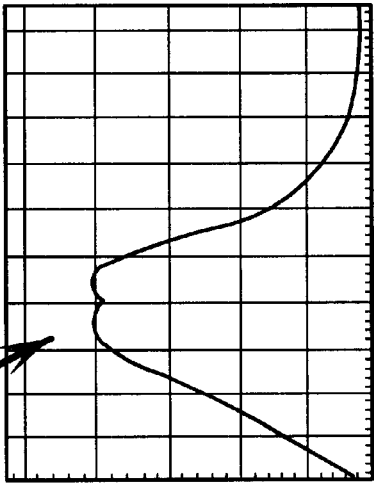
FIG. 18D
2% at 472 nm
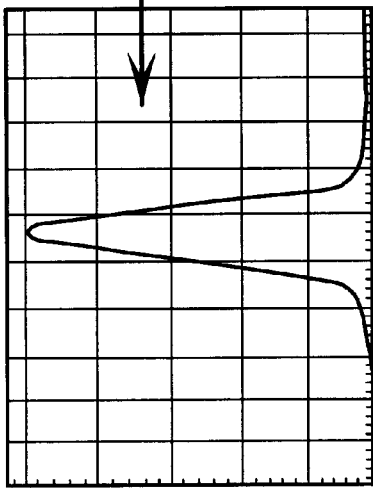
FIG. 18A
25% at 494 nm
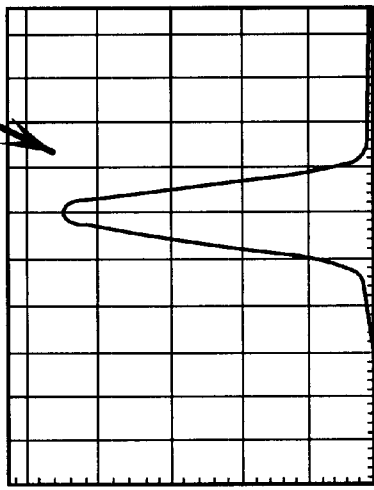
FIG. 18C
9% at 502 nm
FIG. 18

HOLOGRAPHICALLY-FORMED POLYMER DISPERSED LIQUID CRYSTALS WITH MULTIPLE GRATINGS

BACKGROUND OF THE INVENTION

This invention relates to holographically-formed polymer dispersed liquid crystals (H-PDLCs). In particular, the invention relates to multiple grating reflective displays using H-PDLC technology. The invention also relates to H-PDLCs having multiple reflection and transmission gratings.

Polymer dispersed liquid crystals (PDLCs) in their conventional form consist of micrometer-sized liquid crystal (LC) droplets dispersed in a rigid polymer matrix. PDLCs are typically formed using phase-separation or emulsification methods. Photo-polymerization induced phase separation utilizes a mixture of a low molecular weight liquid crystal and a photo-curable monomer. Irradiation of the homogeneous pre-polymer mixture initiates polymerization, which in turn induces a phase separation between the polymer and liquid crystal. The result is a liquid crystal phase separated into droplets and immobilized in a rigid polymer matrix.

FIG. 1A illustrates a conventional PDLC formed by phase separation of a liquid crystal phase from a matrix polymer phase. The entire LC-monomer film is photopolymerized and phase separation occurs randomly throughout the film and results in LC droplets on the order of microns. In the zero-voltage state, the symmetry axis of the droplets is randomly oriented and there is a mismatch of the index of refraction between the matrix polymer and the LC droplets. This condition results in a strongly light scattering (opaque) appearance. By matching the ordinary refractive index of the liquid crystal with that of the matrix polymer, a transparent appearance is achieved when sufficient voltage is applied to reorient the LC droplets. Thus, conventional PDLC displays are capable of switching between an opaque off-state and a transparent on-state, but do not have inherent ability to display color.

Reflective liquid crystal displays have been developed which rely on PDLC materials and, more recently, holographic or optical interference preparative techniques have been used to carry out polymerization to selectively positioned regions of liquid crystal and polymer. Planes of liquid crystal droplets are formed within the sample to modulate the LC droplet density on the order of the wavelength of light. On exposure to an optical interference pattern, typically formed by two coherent lasers, polymerization is initiated in the light fringes. A monomer diffusion gradient is established as the monomer is depleted in the dark fringes, causing migration of liquid crystal to the dark fringes. The result is LC-rich areas where the dark fringes were located and essentially pure polymer regions where the light fringes were located.

The resulting optical interference pattern reflects at the Bragg wavelength, $\lambda = 2nd \sin\theta$, where n is the average index of refraction, $\theta$ is the angle between the substrate and viewing direction, and d is the Bragg layer spacing. The interference pattern can be selected to form Bragg gratings which can reflect any visible light. In the "off state", that is, with no applied voltage, the LC directors are misaligned and light of the Bragg wavelength is reflected back to the observer. Upon application of an applied voltage, the "on state", the device becomes transparent. The reflection intensity is electrically controlled by changing the effective refractive index of the LC droplet planes with an applied voltage. If the refractive index of the LC droplet planes ($n_{LC}$) is different from that of the polymer planes ($n_p$), light of a specific wavelength is reflected by the periodic modulation in the refractive index. If $n_{LC}$ is equal to $n_p$, the periodic refractive index modulation disappears and the incident light is transmitted. If the LC has a positive dielectric anisotropy and the ordinary refractive index $n_o$ is approximately equal to $n_p$, the reflection intensity decreases with increasing applied voltage. This results in a material transparent at all wavelengths and all incident light is transmitted.

Displays incorporating these materials have been reported in "Holographically formed liquid crystal/polymer device for reflective color displays" by Tanaka et al. in *Journal of the Society for Informational Display* (*SID*), Volume 2, No. 1, 1994, pages 37–40; and also in "Optimization of Holographic PDLC of Reflective Color Display Applications" in SID '95 *Digest*, pages 267–270 (1995). In each of the reported H-PDLC displays, however, reflection gratings capable of reflecting only a single wavelength of light were created. See, Tanaka et al. in U.S. Pat. No. 5,748,272.

A major interest in the display industry is the creation of full color reflective displays. U.S. Pat. No. 5,875,012 to Crawford et al. describes a full-color liquid crystal device incorporating three single-color stacked reflective H-PDLCs, which can be activated alone or in combination to provide a broad spectrum of color. Although this configuration results in high reflection efficiencies, it is complicated to fabricate and requires sophisticated electrical drive schemes.

Date et al. in "Three-Primary-Color Holographic Polymer Dispersed Liquid Crystal (H-PDLC) Devices for Reflective Displays" (Proceedings of the 15th International Display Research Conference, Hamamatsu, Japan, 1995; p. 603) report single exposure films of different color. A red, a green and a blue reflecting H-PDLC are reported formed using a single laser source, in which the different reflection gratings were obtained at different incident angles from different H-PDLC layers. Date also reported the use of prisms to obtain the appropriate cross angles for longer wavelengths of light. Using this technique, a full color reflective display can only be built by stacking three H-PDLC layers that individually reflect at red, green or blue wavelengths. There were no multiple grating films made from a single layer H-PDLC to reflect multiple colors.

There is a need to provide a single layer H-PDLC with multiple reflective gratings for constructing a reflective display device that can have a range of colors. Such displays are desirable due to their simplified configuration and because they are sufficiently reflective at low power and in normal operating environments.

Lastly, multiple Bragg gratings in display panels and other devices are desired because specular reflections off of multiple gratings within the layer would increase the operative viewing angle and improve the quality of the reflected image. There is currently no method which provides such capability in the prior art.

Creating a near infrared reflecting H-PDLC is a difficult task to accomplish due to the large wavelength shift required to create Bragg gratings in the near infrared band (~1000 nm) using light in the visible range. The use of visible light lasers to fabricate IR H-PDLCs is attractive for a variety of reasons. The beam is visible with the unaided eye which simplifies alignment and fabrication; and IR photoinitiators, needed for the polymer-initiated phase separation of the H-PDLC, are not readily available or are not developed to a point sufficient for use in this application.

Unfortunately, at the incident angles required to form the infrared interference pattern, the glass surface is highly reflective and very little of the light passes through the supporting glass into the LC-monomer layer. Furthermore, some of the light that does enter the layer is in the form of multiple reflections which wash out the interference pattern.

There is a need to provide an infrared reflective modulating device and a method for obtaining an infrared reflective device that addresses the problems and limitations of the prior art.

SUMMARY OF THE INVENTION

The present invention provides advances and improvements in the manufacture of H-PDLC compositions. The use of simultaneous, coherent multiple laser beam exposure has been exploited to provide multiple grating liquid crystal devices from a single layer H-PDLC.

In one aspect of the invention, a multicolored reflection liquid crystal display device is provided from a single layer configuration having a pair of substrates having a reflective holographic polymer dispersed liquid crystal (H-PDLC) film disposed therebetween. The H-PDLC film includes liquid crystal and matrix polymer layers which form a reflection grating capable of reflecting a wavelength of light, wherein the H-PDLC film includes at least two different reflection gratings capable of reflecting two different wavelengths of light. The substrate may be made up of ITO-coated glass or plastic.

In preferred embodiments, the H-PDLC comprises three or more different reflection gratings capable of reflecting three different wavelengths of light. The reflection gratings may be superimposed on the same area of the film, or they may be located in specific regions of the film, so as to form holographic elements patterns, i.e., spatial overlap or non-overlap, respectively.

In preferred embodiments, the display may provide holographic elements having non-overlapping reflectance spectra, i.e. spectral non-overlap. The display may be capable of reflecting three primary wavelengths of light, i.e., red, blue and green, cyan-magenta-yellow, or any other combination.

In other preferred embodiments, the reflection gratings are selected to provide a broadband reflection in which the holographic elements have overlapping reflectance spectra. The reflected wavelengths of light are any desired wavelength, and in particular are of the visible energy range and IR energy range.

In other preferred embodiments, the reflected light is of substantially equal intensity. Regions of different reflection gratings may be arranged in an array or may be arranged to produce a preselected pattern.

In another aspect of the invention, a method of making a multicolored reflective liquid crystal display is provided, in which a film comprised of a mixture of a liquid crystal and a photo-polymerizable monomer are simultaneously illuminated with a plurality of holographic light patterns capable of providing liquid crystal layers of different spacings so as to obtain different reflection gratings in each of the regions. A plurality of regions may be illuminated with different holographic light patterns.

In preferred embodiments, the holographic light pattern is obtained by providing at least two pairs of laser light beams, each beam pair incident on the film at a different angle to form an optical interference pattern associated with reflection of a different wavelength of light. Additional beam pairs, e.g., three or more are contemplated.

In another preferred embodiment of the invention, the holographic light pattern is obtained by providing laser light of a different wavelength, each laser light forming an optical interference pattern associated with reflection of a different wavelength of light.

In other preferred embodiments, a mask is placed between each of the laser light beams and the film, and each mask forms a pattern of light and dark regions on the film. Each mask is positioned such that at least one light region of the first beam pair coincides with at least one dark region of the second beam pair within the film, and the film is illuminated whereby photo-polymerization of the monomer takes place and formation of polymer and liquid crystal layers occurs. This gives rise to spatially non-overlapping holographic elements.

In other embodiments, at least two different gratings are introduced into the film in a single illumination step, or the power of the light beams is substantially equal. In other embodiments, the mask is of a grid pattern having alternating transparent and opaque grid squares, or other patterns of transparent and opaque regions. In some embodiments, the grid squares are on the order of about 25 $mm^2$ or less, and preferably about 9 $mm^2$ or less; however, much smaller sizes are contemplated as within the scope of the invention. In addition, shapes other than grid squares may be used, such as, rectangular or circular shapes and the like.

In one embodiment, two beam pairs are used and a two-color display is obtained; and in other embodiments, three beam pairs are used and a three-color display is obtained. The method may provide films having a plurality of spectrally non-overlapping reflectances, such as red, blue and green, or cyan, magenta and yellow. Alternatively, the method may provide films having a plurality of spectrally overlapping reflectances, which gives rise to broadband reflectance.

In yet another aspect of the invention, illumination of the film by a selected beam pair or pairs is blocked by a shutter for a portion of the exposure time of the film. Shuttering may be used to shorten or lengthen the exposure of one beam pair with respect to the other beam pairs.

In another aspect of the invention, an apparatus for preparation of a multicolored reflective liquid crystal display includes means for supporting a film comprised of a mixture of liquid crystal and a photo-polymerizable monomer; a laser source; means for producing at least two pairs of laser light beams, each beam pair capable of directing light onto a film housed in the supporting means at a different angle to form an optical interference pattern within a film associated with reflection of a different wavelength of light; and a mask disposed between each of the laser light beams and the supporting means, each mask forming a pattern of light and dark regions on a film housed in the supporting means and each mask positioned such that at least one light region of the first beam pair coincides with at least one dark region of second beam pair within a film. The apparatus may further include shutters disposed between the laser source and the film for preferentially blocking illumination from one or more beam pairs.

In still another aspect of the invention, a method of making a holographic phase dispersed liquid crystal having multiple gratings, includes providing a film comprised of a mixture of liquid crystal and a photo-polymerizable monomer capable of phase separation of the liquid crystal upon polymerization and having first and second opposing surfaces; and illuminating the film with at least three beams of laser light, wherein at least one beam is incident on the first opposing surface of the film and at least one beam is incident on the second opposing surface of the film, and having at least one region in which three laser beams overlap, whereby upon photo-polymerization of the monomer and phase separation of the liquid crystal/polymer, a transmission grating and two reflection gratings are formed in the three-beam overlapping region. Beam arrangements employing a greater number of beams and resulting in a greater number of gratings also are contemplated.

In a preferred embodiment, the film further has at least one region in which two beams overlap and a reflection grating is formed in the two-beam overlapping region. Beam arrangements employing a greater number of beams and resulting in a greater number of gratings also are contemplated.

The intensity of light incident on the first opposing surface of the film may be unequal or may be approximately equal to the intensity of light incident on the second opposing surface, depending upon the desired outcome.

In other preferred embodiments, the laser beam is incident on the film at a different angle.

In another aspect of the invention, a multiple grating liquid crystal display device includes a pair of substrates having a holographic polymer dispersed liquid crystal (H-PDLC) film disposed therebetween. The H-PDLC film includes a first region comprising liquid crystal and matrix polymer layers forming a transmission grating and a plurality of reflection gratings and at least one second region comprising liquid crystal and matrix polymer layers forming a reflection grating capable of reflecting a preselected wavelength of light. The transmission grating typically exhibits Bragg diffraction (when the spacing between the LC droplet layers is on the order of the wavelength of incident light), but may also exhibit other behavior, such as for example, Raman Nath diffraction (when the spacing between the LC droplet layers is greater than the wavelength of incident light).

It is also within the scope of the invention to combine a plurality of aforementioned single layer H-PDLC films having multiple spectral gratings into a single display device.

DEFINITIONS.

"Bragg grating" means periodically repeating layers of a polymer and liquid crystal (LC) which form LC planes having a spacing that satisfy the grating equation, $$\Lambda = \frac{\lambda}{2n\sin(\psi/2)} \quad (1)$$

where λ is the wavelength of the incident laser light, n is the average index of refraction of the holographic medium, and ψ is the angle between the interfering beams. When the light source and the observer are on the same side of the holographic film, the grating is known as a reflection grating. When the light source and the observer are on opposite sides of the holographic film, light is diffracted upon transmission through the holographic film and the grating is known as a transmission grating.

"Holographic technique", "holography", "holographic light", as those terms are used herein refer to the formation of interfering light patterns in a three dimensional space.

"Holographic element" refers to the smallest spectrally distinct element of a display, i.e., the smallest region having a homogenous grating. The holographic element may be defined by one or more electrodes, e.g., multiple gratings may be homogeneously superimposed over a region of the film, however, each of the gratings may switch between on-and off-states at different potentials. In those instances where the holographic element is defined by a single electrode, the holographic element is also a "pixel", i.e., the smallest switchable element of the device.

"Spatially overlapping" and "spatially non-overlapping" refer to the location of the grating on the film. When the gratings are non-overlapping, a single grating occupies a defined region of the film and does not share the region with other gratings (other than minor and unintentional overlap due to improper alignment).

"Spectrally overlapping" and "spectrally non-overlapping" refer to the separation between two reflectance peaks. Reflectance peaks are considered non-overlapping if two adjacent spectra do not overlap at full width at half maximum (FWHM).

When referring to spectral reflectance and wavelength, it is understood that the peak wavelength represents the peak centered around a peak maximum. Width of the full peak may vary, but typically is in he range of 20 nm (FWHM) for single grating peaks.

BRIEF DESCRIPTION OF THE DRAWING

The invention is described with reference to the following drawings, which are provided for the purpose of illustration only and which are in no way limiting of the invention, and in which:

FIG. 2B is a cross-sectional view of a multicolored reflective H-PDLC display of the invention in which the holographic elements are spatially superimposed to reflect multiple wavelengths from a common region;

FIG. 2C is a cross-sectional view of a multicolored reflective H-PDLC display of the invention in which the holographic elements are angularly multiplexed;

FIG. 10A is a diagram shown the regions formed using a three-beam apparatus, and 10B the resultant gratings;

FIGS. 18(A)–18(D) are reflectance spectra for different regions of a multigrating film of the invention.

DETAILED DESCRIPTION OF THE INVENTION

Figure 1:
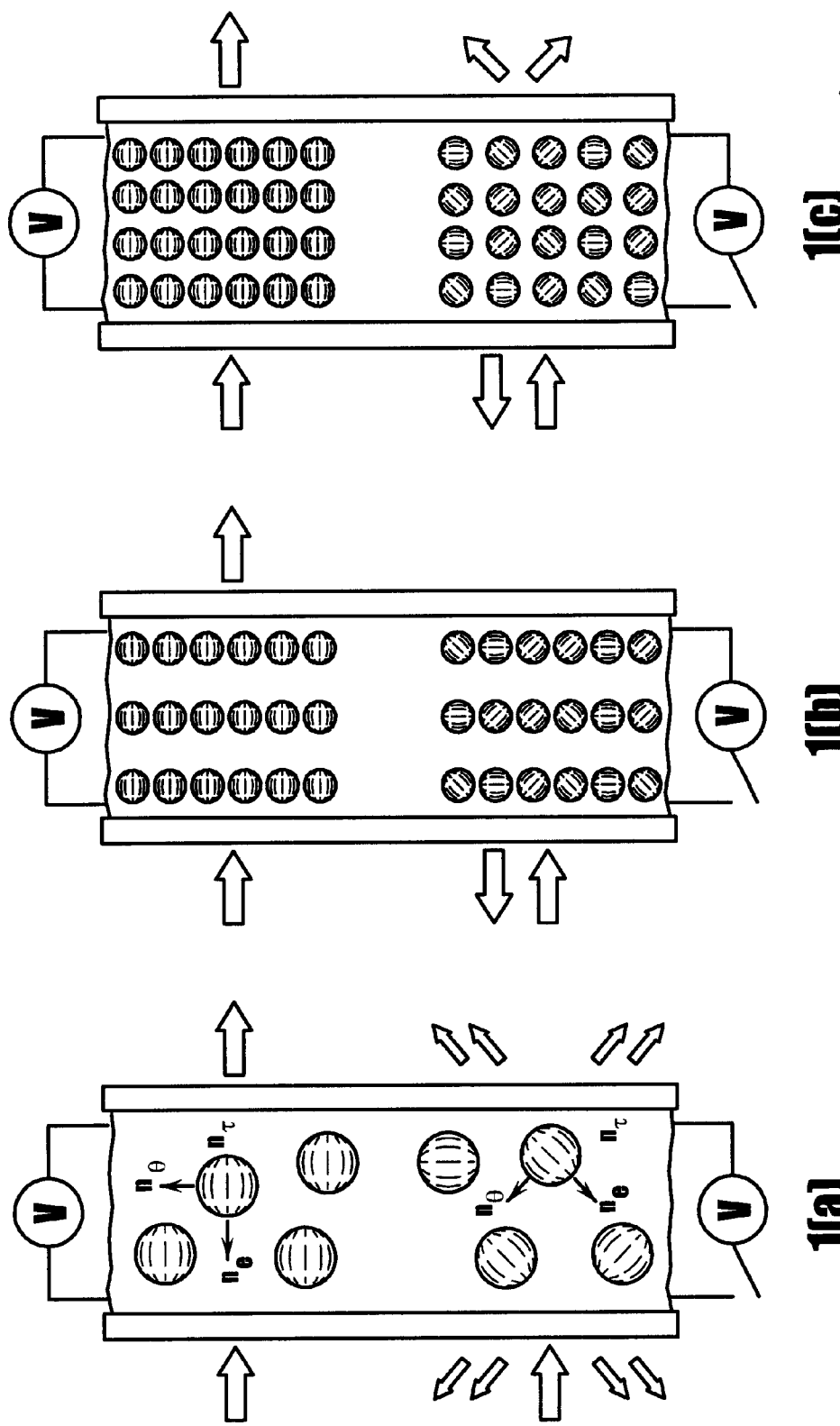
FIGS. 1A–C are schematic views illustrating a conventional PDLC (1A); a reflective H-PDLC (1B); and a transmission H-PDLC (1C)

The invention centers on techniques for creating H-PDLCs having new and useful properties. FIG. 1 shows three different configurations of polymer dispersed liquid crystals (PDLC) which capitalize on the phase separation of liquid crystal and evolving polymer during polymerization. FIG. 1A, as previously discussed, illustrates a conventional PDLC.

H-PDLCs are phase separated compositions formed under holographic conditions. Instead of random arrangement of LC droplets, the holographic exposure induces a periodic array of LC droplets and matrix polymer planes, as shown in FIGS. 1B and 1C. Upon illumination with holographic light, the monomer diffuses to high light intensity regions where it polymerizes. The liquid crystal remains in the dark regions and phase separates into small droplets on the order of nanometers, e.g., 10–200 nm, in ordered, stratified layers. The actual phase-separated morphology varies dependent upon the particular liquid crystal and the relative composition of the liquid crystal and matrix polymer used. For lower liquid crystal concentrations, spherical or ellipsoidal LC droplets are localized in stratified layers and are completely surrounded by matrix polymer. At higher liquid crystal concentrations, connectivity between the LC droplets may be observed.

The devices can reflect as shown in FIG. 1B or diffract as shown in FIG. 1C for various wavelengths depending upon the layer spacing. The coherent scattering occurs as either a reflected or a diffracted wavefront depending on the orientation of the grating. This, in turn, is dependent upon the beam geometry during phase separation.

Reflective H-PDLCs are attractive candidates for reflective display applications. They exhibit narrow wavelength bands of high reflection efficiency, which can be controlled by electric fields. Due to the random nematic director alignment within the LC-rich plane of the "off-state", these materials are not polarization dependent and hence all polarization states can be used for a brighter display.

It is particularly attractive to include multiple reflection gratings in a single film. Multiple reflection grating H-PDLC may be used, by way of example, for full color displays and broadband spectral reflectance devices. The intristic Bragg peaks from a conventional H-PDLC are typically very narrow (FWHM<20 nm), making them excellent candidates for full color displays. By incorporating multiple reflection gratings capable of reflecting light of particular wavelengths, for example, the primaries red, green and blue, full-color displays are obtained. Alternatively, multiple reflection gratings centered at wavelengths very close to one another in the spectral range results in a broadening of the bandwidth and a broadband reflector is obtained. Finally, such multiple reflection gratings can increase the viewing angle of the display.

Figure 2A:
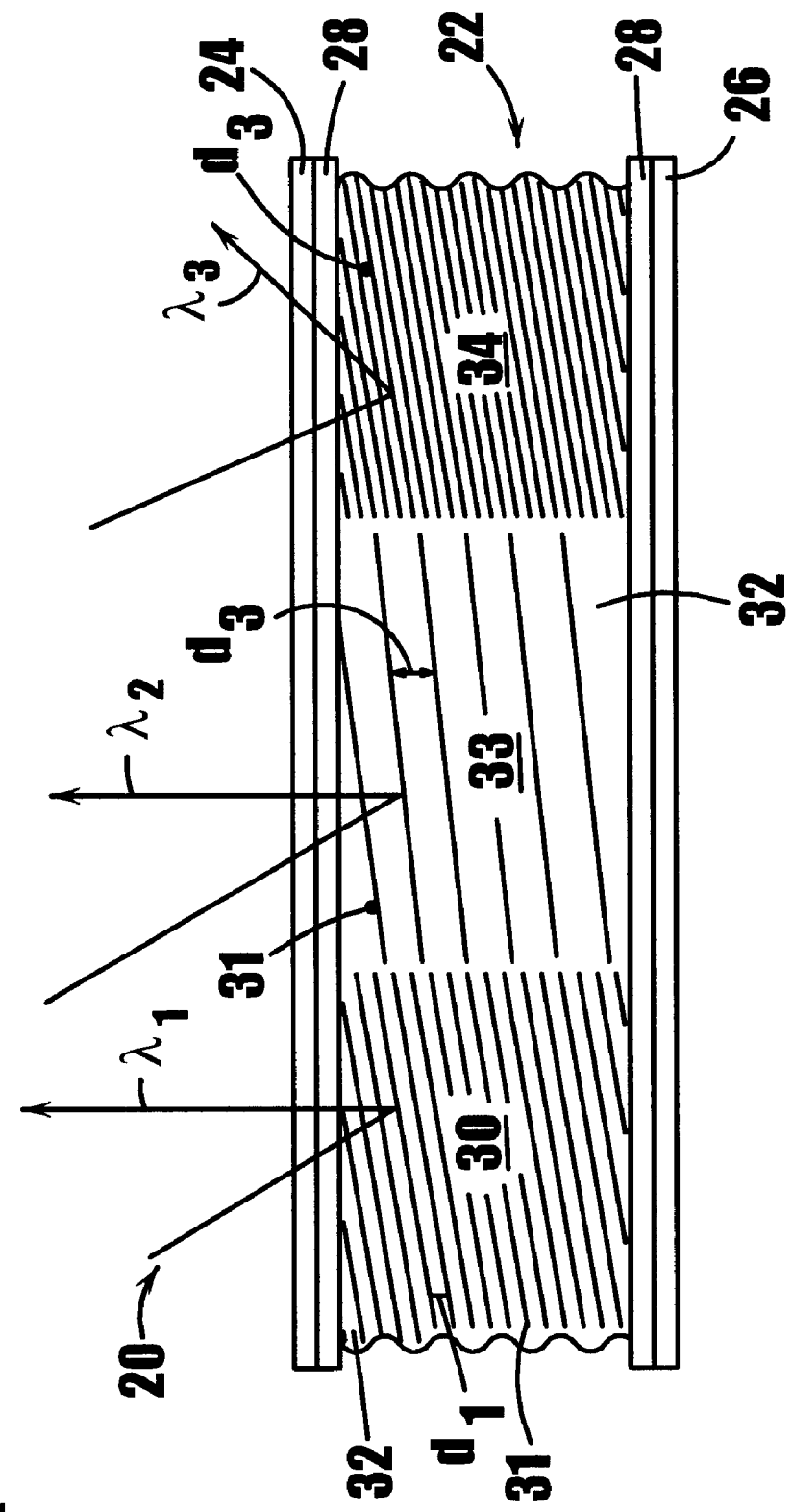
FIG. 2A is a cross-sectional view of a multicolored reflective H-PDLC display of the invention in which the holographic elements are spatially separated.

An exemplary reflective H-PDLC 20 is shown in FIG. 2A, in which the reflection gratings are spatially separated. An H-PDLC layer 22 is supported by opposing glass or plastic substrates 24, 26. The substrates are preferably coated with a conductive layer 28, such as indium tin oxide (ITO). A region 30 has a reflection grating (i.e., a periodic layering of LC droplet layers 31 in a polymer matrix 32) with a spacing $d_1$. Adjacent to this is a region 33 having a different reflection grating with a spacing $d_2$. Adjacent to this is a region 34 having a different reflection grating with a spacing $d_3$. All light incident on the surface of the layer will be transmitted with the exception of the wavelength which satisfies the Bragg equation for the particular d-spacing of the reflection grating. Thus, region 30 reflects light of wavelength $\lambda_1$, whereas region 33 reflects light having a wavelength $\lambda_2$ and region 34 reflects light having a wavelength $\lambda_3$.

The reflection gratings may be located in discreet regions in the layer with little or no overlap of the individual reflection gratings. These domains within the H-PDLC are hereafter referred to as "holographic elements". In one embodiment, the holographic elements are located adjacent to one another, without significant spatial overlap, so as to maximize color density and variety in the layer, while maintaining color purity. When each of the holographic elements reflects only a single wavelength of light and relies on a single electrode to switch the grating, such elements may be considered pixels in the conventional meaning of the term.

The reflection gratings may be selected to reflect any wavelength of light. For example, region 30 may be reflective of light having a center wavelength in the range of 610–650 nm (e.g., red light) and region 33 may be reflective of light having a center wavelength in the range of 520–560 nm (e.g., green light). Additional regions 34 may be included which are reflective of light in other ranges, such as light having a center wavelength in the range of 440–480 nm (e.g., blue light). Such films are considered to contain spectrally, as well as spatially, non-overlapping gratings.

The reflection gratings may be selected to reflect light centered at similar wavelengths of light. For example, region 30 may be reflective of light having a center wavelength in the range of 610 nm; region 33 may be reflective of light having a center wavelength in the range of 630 nm; and regions 34 may be reflective of light having a center wavelength in the range of 650 nm. The result is a broadband reflectance centered around light in the red range of the visible spectrum. Such films contain spectrally overlapping gratings.

Alternatively, the reflection gratings may be spatially overlapped, that is, two or more reflection gratings occupy a common region of the film, to reflect a broad bandwidth light. Such an exemplary reflective H-PDLC 40 is shown in FIG. 2B, in which similar elements are similarly labeled. The grating associated with region 30 may, for example, reflect at 610 nm, while those associated with regions 33 and 34 reflect at 630 nm and 650 nm, respectively. All three gratings are superimposed within a region 42 to reflect a broad band light from 610 to 650 nm. If more gratings are overlapped, a broader reflection bandwidth is generated. Such a configuration also helps in increasing the viewing angle of the display device, in that multiple gratings have different angles of observation with respect to the surface of the film may be incorporated into a single holographic element, yet still reflect substantially the same color (as detected by the human eye).

Alternatively, the reflection gratings may be spatially overlapping in that they occupy a common region of the film, and yet not be superimposed upon one another. Such an exemplary reflective H-PDLC 50 is shown in FIG. 2C, in which similar elements are similarly labeled. Both gratings occupy the same region 52 of the film; however, different reflection gratings are located at different depths within the film, as measured as the distance from either surface towards the center of the film. The grating associated with region 54 at the outermost layers of the film (indicated as $d_{54}$) may, for example, reflect at 610 nm, while that associated with region 56 (indicated as $d_{56}$) may reflect at 480 nm. A film having this novel arrangement of reflection gratings is believed to be made in practicing the temporal multiplexing method of the invention, as is discussed in greater detail below.

According to a method of the invention, a multiple grating reflective H-PDLC layer advantageously is prepared in a single step, thereby greatly simplifying the method of manufacture. Production of multiple gratings may be accomplished by simultaneously illuminating a precursor layer containing a photocurable monomer and a liquid crystal with two or more holographic light patterns capable of producing LC layers of different d-spacings.

The light source used in producing different reflection gratings may be light of the same wavelength which illuminate the sample surface at different angles of incidence (varying the value of $\theta$ in the grating eq 1). Alternatively, different reflection gratings may be obtained illuminating the prepolymer layer with light of different wavelengths (varying the value of $\lambda$ in the grating eq 1). While effective, the latter approach is less desirable due to the added cost and complexity of using multiple lasers.

In a preferred embodiment, a single laser source is used. The beam is split into the appropriate number of beams, which are directed so that pairs of light beams interfere so as to produce the holographic light patterns used to create different reflection gratings within the sample. The crossing point of each laser beam pair is positioned and arranged so that a monomer-LC layer may be exposed to multiple holographic patterns in a single exposure. Multiple reflection gratings in a single layer are obtained thereby.

Figure 3:
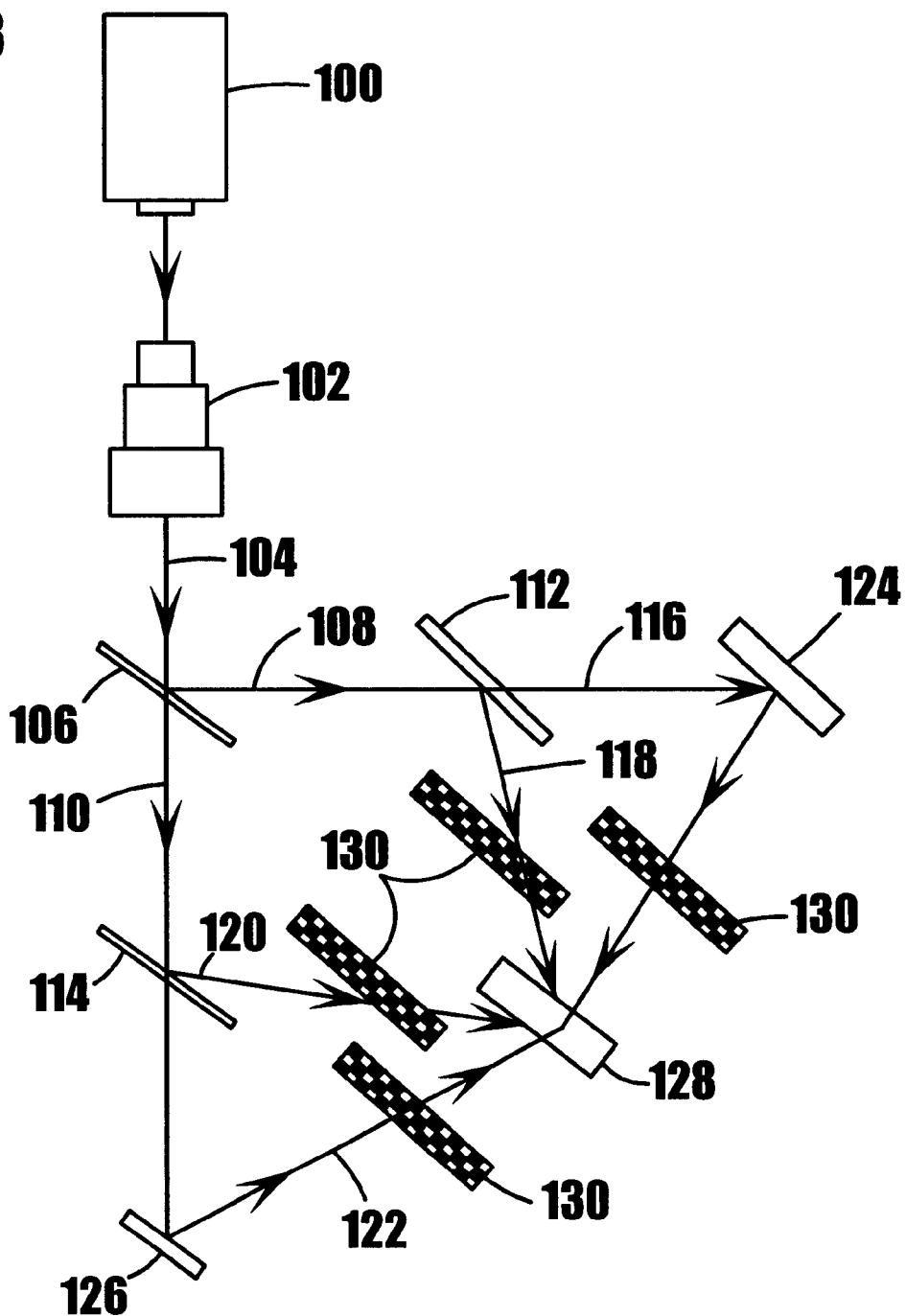
FIG. 3 is a schematic view illustrating the method and apparatus used in the production of a multicolor reflective H-PDLC.

The method and apparatus is described with reference to FIG. 3. A laser light source 100 generates light of a predetermined wavelength and optionally is then passed through a beam expander and spatial filter 102. The resultant laser beam 104 is split into the number of beam pairs required for the particular application. Shown in FIG. 3, beam 104 is split first using a beam splitter 106 into beams 108, 110, which is further split at beam splitters 112, 114 into beams 116, 118 and 120, 122, respectively. With the additional use of mirrors 124, 126, the laser beams are crossed to create a holographic light pattern. A sample 128 is located at the crossover points of beam pairs.

Figure 4:
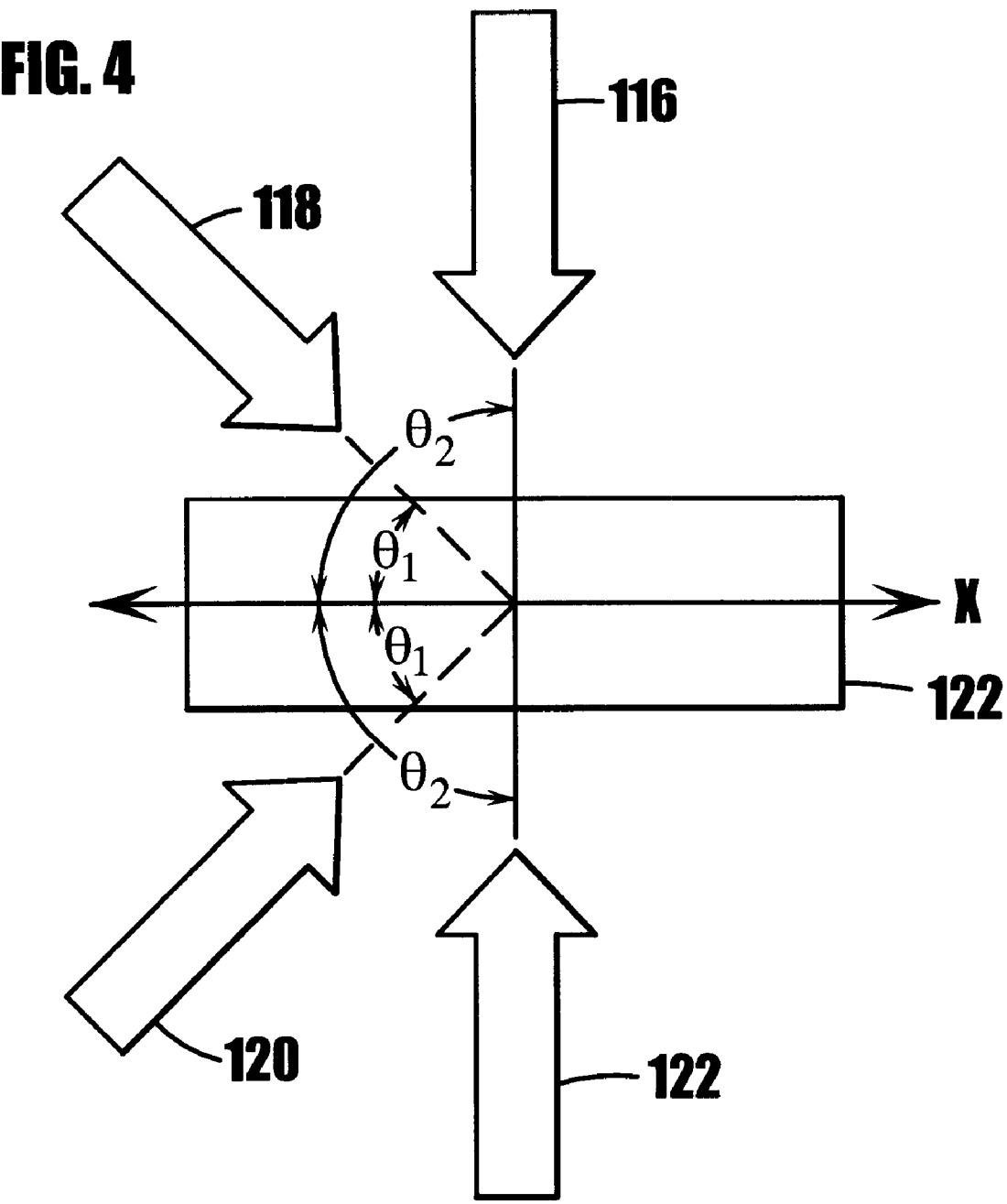
FIG. 4 is a schematic view illustrating beam arrangement in the method used in the production of a multicolor reflective H-PDLC.

Beam pairs are aligned so that a first beam pair 118, 120 is incident at one angle, $\theta_1$, and the second beam pair 116, 122 is incident at a second angle, $\theta_2$, relative to the plane of the sample surface, as shown in FIG. 4. Additional laser beams are used to create as many additional holographic patterns as are desired for a particular display application. If it is desired to produce three reflection gratings, the beam is split into six beams. In preferred embodiments, the beams incident on the sample are of equal intensity, that is having ¼th or ⅙th the power of the original laser in preparing samples having two or three colors, respectively. It is observed that light of equal intensity forms holographic light of higher grating contrast leading to more efficient reflection gratings.

The sample is exposed to light for a short time, typically in the range of 20–60 seconds. The exposure time strongly depends on laser power (intensity), the choice of monomer, dye and liquid crystal, as well as the relative concentrations of the materials. The area of the sample illuminated by the holographic light formed by the first beam pair will produce a reflection grating different from that of the area of the sample illuminated by the holographic light formed by the second beam pair, thereby simultaneously producing areas having different reflection gratings in a single film. Spectral reflectance of each holographic element may be adjusted to produce whatever ratio of color mixing is desired.

In the above description, the dimensions of the reflection gratings produced upon exposure are dependent on the beam area incident on the film and is preferentially used when preparing spatially overlapping reflection gratings. The area may be varied with the use of beam expanders and condensers to increase or decease the area of light incidence. However, control over the shape of the reflection grating (e.g., circular vs. rectangular) and the relative positions of different reflection grating regions (holographic elements) is difficult. In a preferred embodiment when preparing spatially non-overlapping, holographic elements, a shadow mask 130 is used to select the dimensions and positions of holographic elements. Shadow mask 130 is inserted between the beams and the sample. The mask permits only light of a preselected pattern (size and shape) to pass through and illuminate the film.

Figure 5:
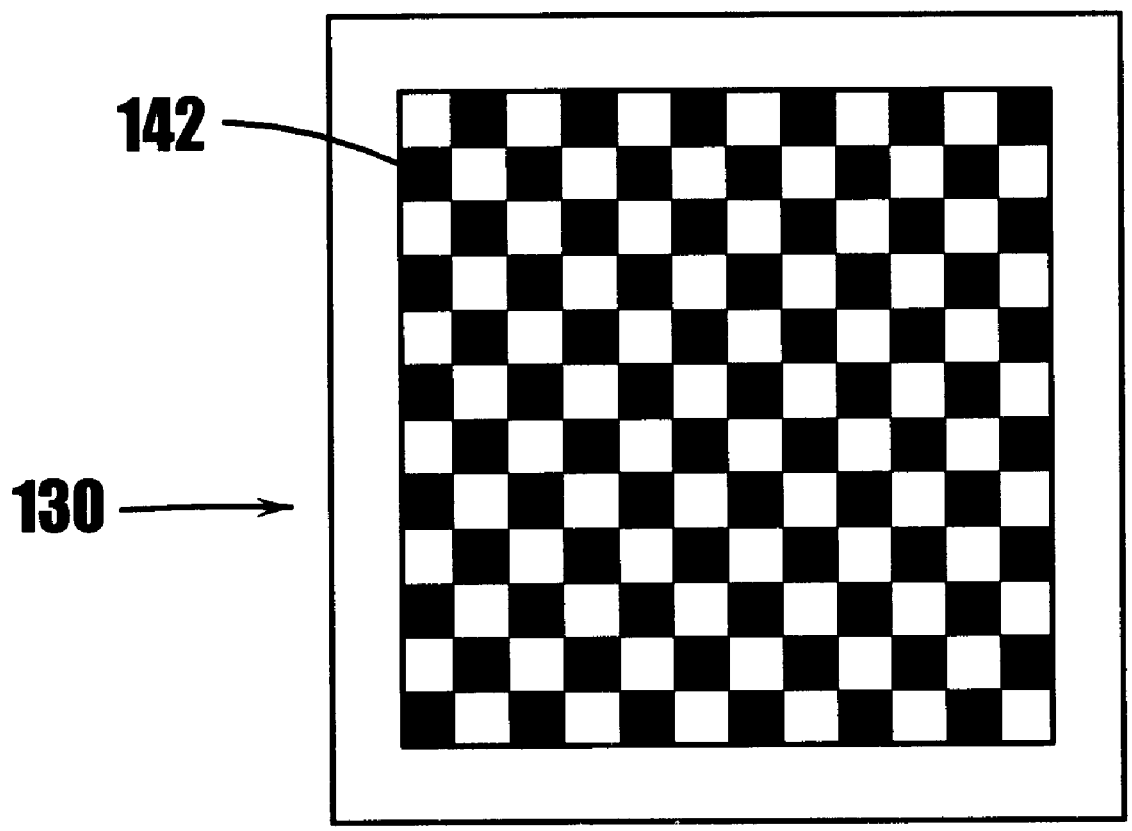
FIG. 5 is a illustration of a shadow mask used to create a two-color pixellated H-PDLC.

An exemplary mask 130 is shown in FIG. 5, in which dark regions 142 represent gaps in the mask through which light passes. The masks are arranged so that light from beams 118, 120 pass through gaps 142 and coincide at the sample surface. Light from the other two beams 116, 122 also form overlapping light patterns at the sample surface. Adjacent regions of different reflection gratings may be produced by positioning the two sets of masks such that the light of a second mask set illuminates the dark regions produced by the first mask set.

The masks may provide any desired pattern. In one embodiment shown in FIG. 6A, the holographic elements are arranged in a predetermined order. In the top view of a reflective display, regions 30, 33 and 34 are arranged in a periodic and repeating array. Holographic elements of a particular reflection grating may be evenly distributed throughout the film. This is particularly desirable when a full-color display is desired having reflected primary light. The holographic element arrays may be selectively activated to provide any color combination and thereby obtain a full color display.

Figures 6A, 6B:
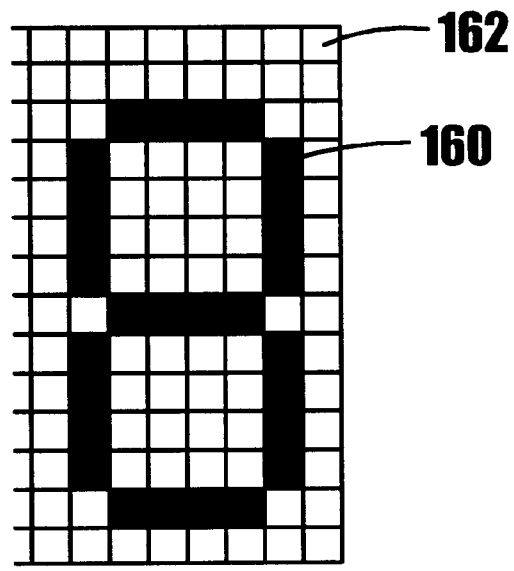
FIG. 6A is a top view of a multicolor reflective H-PDLC display with periodic and repeating holographic elements, and 6B is a top view of a multicolor reflective H-PDLC display with holographic elements arranged into a preselected design.

Another embodiment is shown in FIG. 6B in which holographic elements of different reflection gratings may be grouped together to generate a particular design or geometry. In the top view of a reflective display, regions 160 shown in dark hatching may be of one reflection grating while open regions 162 are of another. In still other preferred embodiments, the reflection grating may be located in the film in combination with transmission gratings. In this embodiment, therefore, regions of transparence may be combined with regions of reflection to provide a desired display appearance. These and other variations will be apparent to one familiar with the display art.

The masks may provide any desired size of holographic element. Holographic elements may be prepared having dimensions in the range of those required of high resolution displays. Technology for mask design and alignment sufficient to produce high resolution displays is available in the art.

The angle of light incidence as described in FIG. 4 is adjusted to provide reflected light of the desired wavelength. In those instances where light of significantly different wavelengths is desired, the angles of incidence vary greatly. For example, the angle of incidence to produce reflected red, green and blue light may vary by about 30°, e.g., $\theta_1$, $\theta_2$ and $\theta_3$ are 90°, 60°, and 30°, respectively. In contrast, where light of similar wavelengths is desired, the angles of incidence vary only slightly. For example, the angle of incidence to produce a broadband reflector may vary by as little as 5° or less.

It has been observed that ideal exposure times differ for different incident angles of laser light. In particular, it has been observed that red angle gratings are of a poor quality due to the low angle of incident light and waveguiding in the glass mask. This difference in spectral reflectance quality may be minimized varying the amount of time each laser beam is incident on the film surface. The quality of red angle gratings is improved by delaying exposure of the film to red angle laser light.

By way of example for a red-green-blue display, a shutter is disposed between the laser beam pairs and the film of the "red angle" laser beam, that is the laser beam incident on the film at an angle to produce red reflected light. The beam is shuttered for a short time, e.g., 1–2 seconds, while the remaining laser beam pairs illuminate the film. This reduces the amount of time the film is exposed to the red angle laser light. After 1–2 seconds the shutter is opened and the film is fully illuminated by all three beam pairs. Such a methodology is referred to as "temporal multiplexing" because it provides the ability for multiple time exposures of the film for different laser light. Temporal multiplexing permits one to blanket expose the red angle grating regions, so no there is no extra diffraction from the mask. The resultant film demonstrates equal intensity spectral reflectance for all three reflection gratings. Temporal multiplexing also permits extended exposure of the film to red angle laser after blue and green angle regions are developed, since blue and green are already set and extended illumination in the red angle grating region does not affect these gratings.

When it is desirable to produce H-PDLC devices that reflect in the IR range, it is desirable to modify the procedure so that a visible light laser can write the significantly larger infrared LC droplet planes. Near IR bands require spacings of about 1000 nm, yet they may be produced using a green laser (514 nm) according to the method of the invention. At the incident angles necessary to form an infrared interference pattern, the glass is highly reflective and very little of the light passes through the glass into film. The light that does enter is in the form of multiple reflections which wash out the interference pattern. These drawbacks may be overcome by use of a prism which bends the laser light into the angles necessary to shift the laser wavelength into the near infrared band and which is optically coupled to the film.

Figure 7:
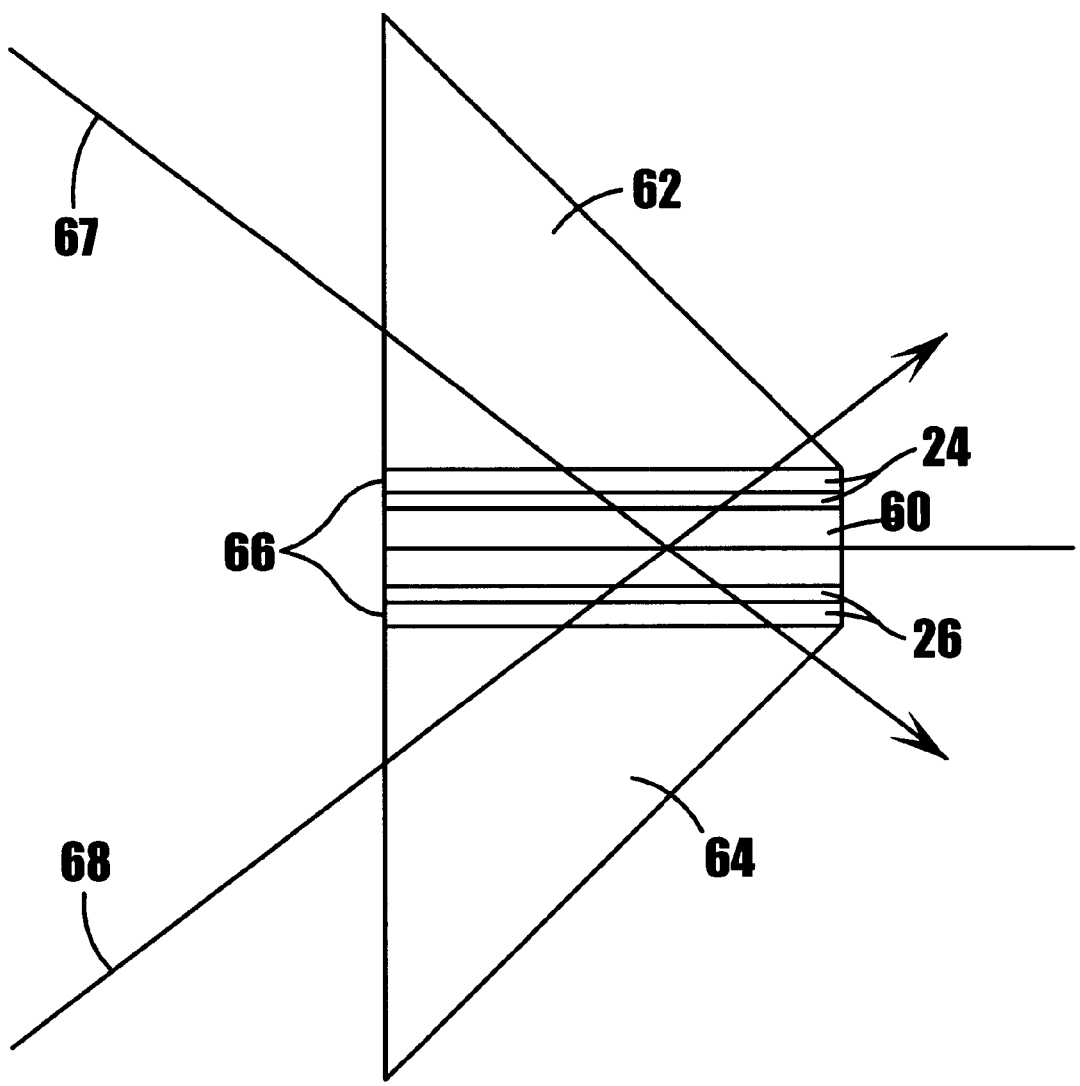
FIG. 7 is a schematic view illustrating one method and apparatus used in the production of an infrared reflecting H-PDLC.

In preferred embodiments, a 45° right angle prism or a 30°–60°–90° prism (or prism of another angle set) may be used. One way of bending the light to an angle suitable for infrared reflectance is to use two equal prisms with the film sandwiched in between, as is shown in FIG. 7. A film 60 is placed between prisms 62, 64 with an index matching fluid 66 placed between the prism and the film. An exemplary index matching fluid is glycerin.

A laser light source (not shown) is used to generate light of a predetermined wavelength and optionally is then passed through a beam expander and spatial filter (not shown). The resultant laser beam is split into the number of beam pairs, shown as beams 67, 68, required for the particular application. The beams are reflected so that they enter the prism from the same, nearly parallel angle. The beams are bent by the prisms and form an interference pattern on the sample at the angles necessary to shift the laser wavelength into the near infrared band.

Figure 8:
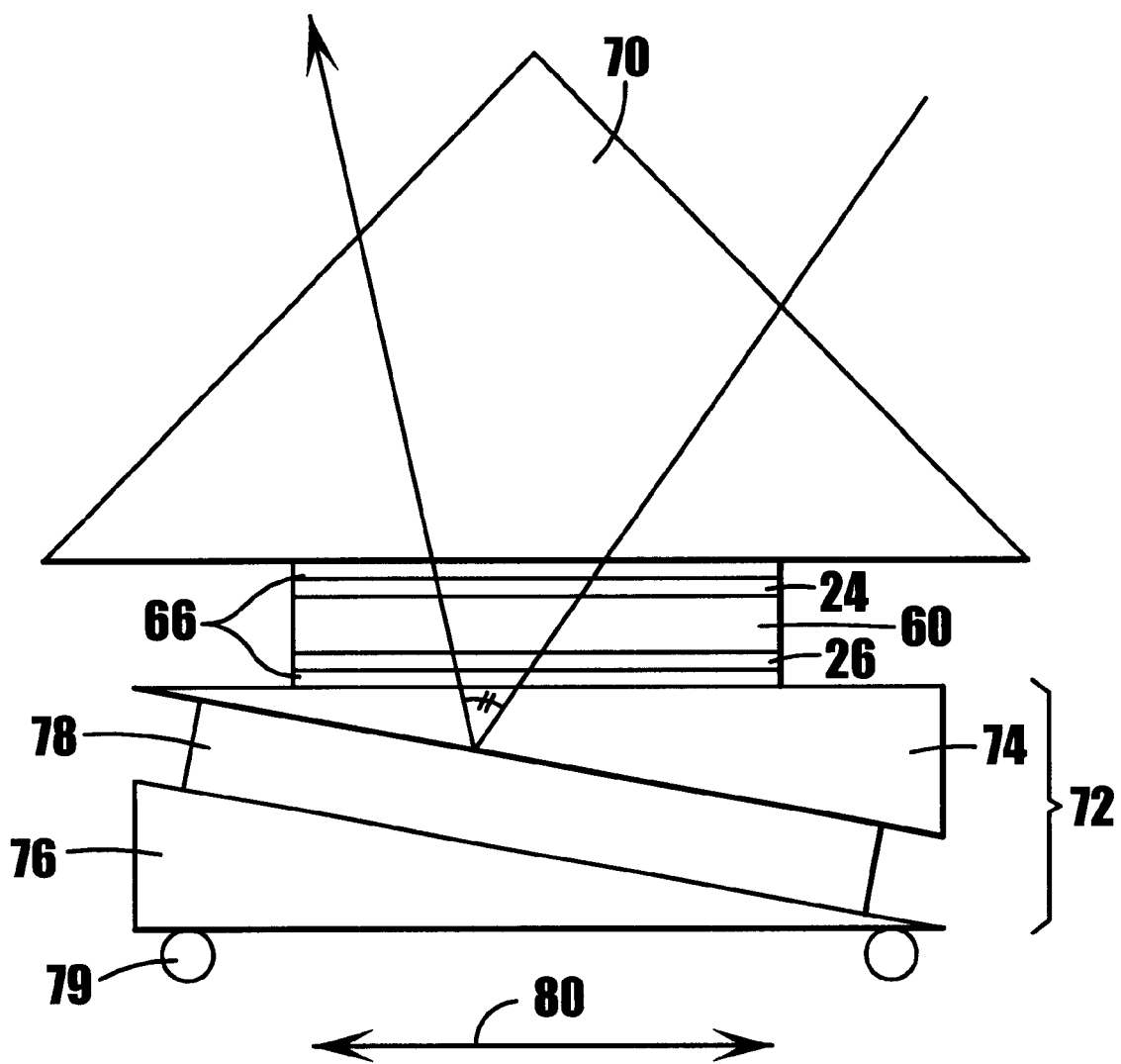
FIG. 8 is a schematic view illustrating one method and apparatus used in the production of an infrared reflecting H-PDLC.

In another embodiment of the invention, a single prism may be used in conjunction with a mirrored surface to obtain an infrared reflection grating. With reference to FIG. 8, a single prism 70 is placed in optical contact with a top surface of a film 60. The prism/film is positioned onto a prism/mirror/prism stack 72. Prisms 74, 76 are selected to provide a selected angle of reflection off of mirror 78, while maintaining a horizontal surface onto which the film is positioned. This offsets the resulting grating by about 30° from parallel, so that the viewing angle is not in the specular reflection. The various components of the set-up are optically coupled using an index matching fluid, such as glycerine. During exposure, the beam enters the prism, is bent down through the sample and reflected back out at an angle (set by the arrangement of the prism/mirror/prism stack) from its original incident path. The reflected beam thereby combines with the incident beam to create an interference pattern on the sample to obtain the infrared Bragg reflector. The entire apparatus may be mounted on a movable track 79 so that is can be moved in one dimension (designated by arrow 80) with respect to the mirror reflecting the laser beam. In this way, the incident beam angle can be adjusted simply by moving the apparatus along one dimension. Using fixed positions along the track, one can predict the resulting wavelength of the Bragg grating to be created during an exposure.

Although the method is described using a single laser beam to write a single reflection grating, the methods described herein for the preparation of multiple grating films may be used to produce films having multiple reflection gratings in the infrared spectrum. These multiple gratings can be spatially and/or spectrally overlapped or non-overlapped to reflect broadband IR spectrum or multiple IR wavelengths, respectively.

The H-PDLC includes conventional materials used in the preparation of PDLC compositions. Thus, the polymer may be any suitable photocurable composition. Exemplary polymers include acrylics and urethanes having multiple functionalities to provide varying degrees of crosslinking. See, Fontecchio et al. "Improvement in Holographically-formed Polymer Dispersed Liquid Crystal Performance through Acrylated Monomer Functionality Studies" in *Proc. SPIE* Vol. 3800, '99. The polymer should have a refractive index similar to that of the ordinary refractive index of the liquid crystal. Exemplary materials include dipentahexacrythritol-pentaacrylate (DPHPA) (Sigma-Aldrich), SR399 available from Sartomer, SAM114 available from EM Industries, and Ebecryl 8301, 4883 and 4866, available from UCB Radcure.

The LC may be any suitable liquid crystal. Suitable LCs include low molecular weight liquid crystals having high birefringence and an ordinary refractive index substantially similar to that of the matrix polymer. Exemplary LCs are those available from EM Industries, such as BL038, E7, E44 and TL205.

The single illumination process provides decided advantages over multiple step processes. A comparative, multistep process in which a mask was used to sequentially expose the sample to different incident angles of light, thus adding holographic elements of a single color in steps, was considered unsuccessful. Poor results were obtained due to polymerization beyond the exposed area, presumably due to free radical diffusion and light scattering into the unexposed regions. The unexposed areas are then partially cured and depleted of materials and produce an inferior grating when ultimately exposed to light.

The methodology which has been used hereinabove to prepare multiple reflection grating LC devices may be used to create multiple gratings of reflection and transmission in a single sample. The multiple gratings may be used to broaden the viewing angle of a reflective display due to the appearance of specular peaks at multiple viewing angles, or to obtain switchable multiple beam splitters.

The multiple beam exposure technique for the formation of multiple grating devices consists of superimposing multiple laser beams on a single H-PDLC sample. The present embodiment selectively overlaps incident light beams to create multiple reflection gratings and transmission gratings in a single exposure.

Figure 9:
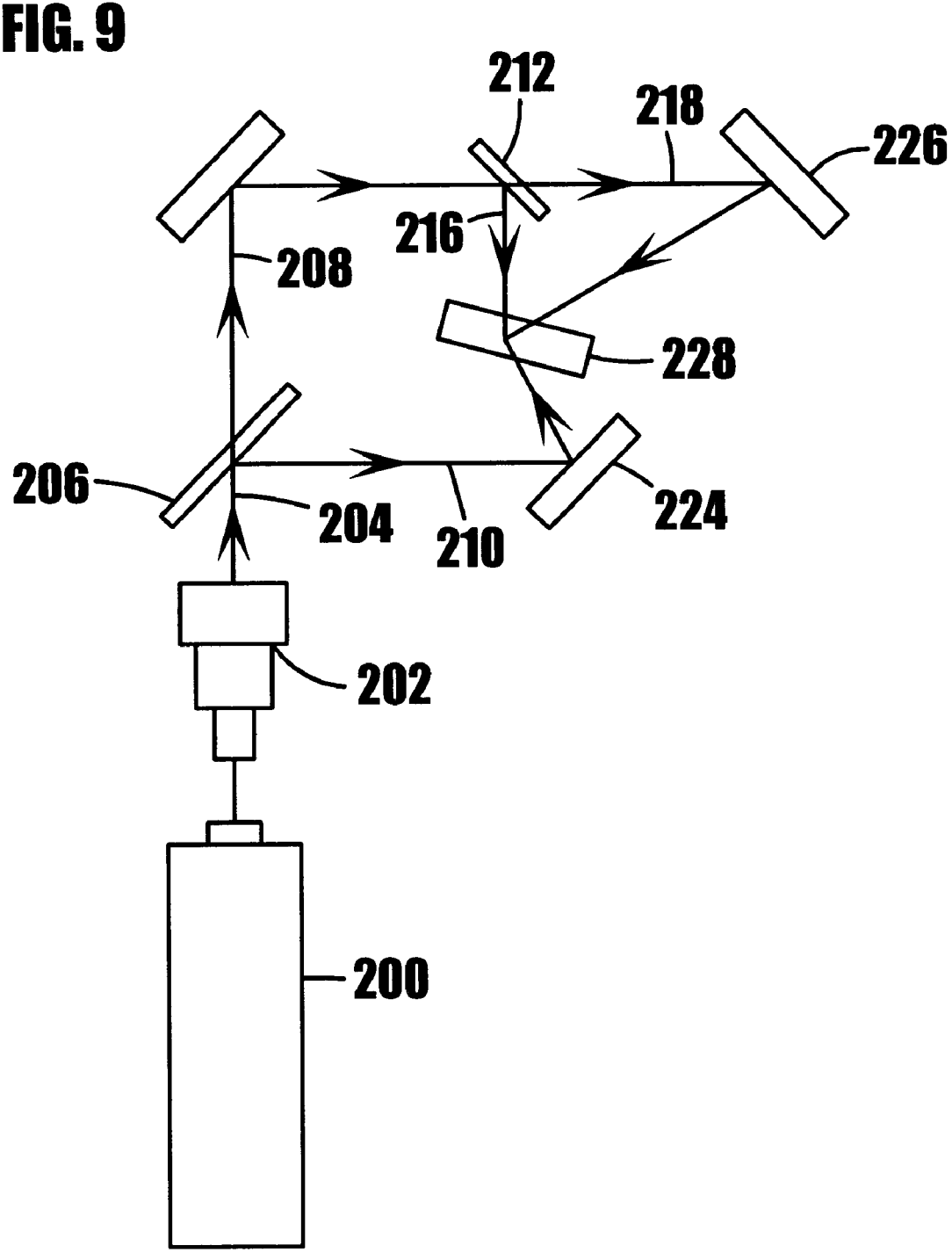
FIG. 9 is a schematic view illustrating the method and apparatus used in the production of a multiple grating H-PDLC.

FIG. 9 shows the experimental set up of the apparatus used to create multiple grating samples. A laser light source 200 generates light of a predetermined wavelength and is then passed through a beam expander and spatial filter 202. The resultant laser beam 204 is split first using a 50/50 beam splitter 206 into beams 208, 210, of approximately equal intensity, e.g. 50% of original beam power. The first beam 208 is further split at 50/50 beam splitter 212 into beams 216, 218, of equal intensity, e.g. 25% of original beam power. With the additional use of mirrors 224, 226, the laser beams are directed onto the surface of a sample 228. The particular beam intensity configuration (50, 25, 25) is merely exemplary. Other combinations are within the scope of the invention, although in preferred embodiments the power is substantially equal on both sides of the film.

The 50% power beam 210 is used to illuminate the entire surface. A beam expander may be used for this purpose. Beams 216 and 218 are directed onto the surface within the area illuminated by beam 210. At least a portion of beams 216 and 218 overlap with each other on the surface to form the pattern shown in FIG. 10A. This alignment allows for the formation of two distinct double beam exposures from interfering beams, thereby creating two different Bragg reflection gratings 220, 222, shown in FIG. 10B. In the area where all three beams overlap, a transmission grating, as well as two reflection gratings are created in the three-beam area.

It is contemplated that more than three beams may be used in the method of the invention, although other configurations are contemplated as within the scope of the invention. For example, different numbers of incident beams, laser beams of different intensities, different wavelength and angles of incidence all are within the scope of the invention. Simultaneous illumination of the sample with more than three beams could form more complex grating structures, which may be useful in a variety of applications.

Figure 11A:
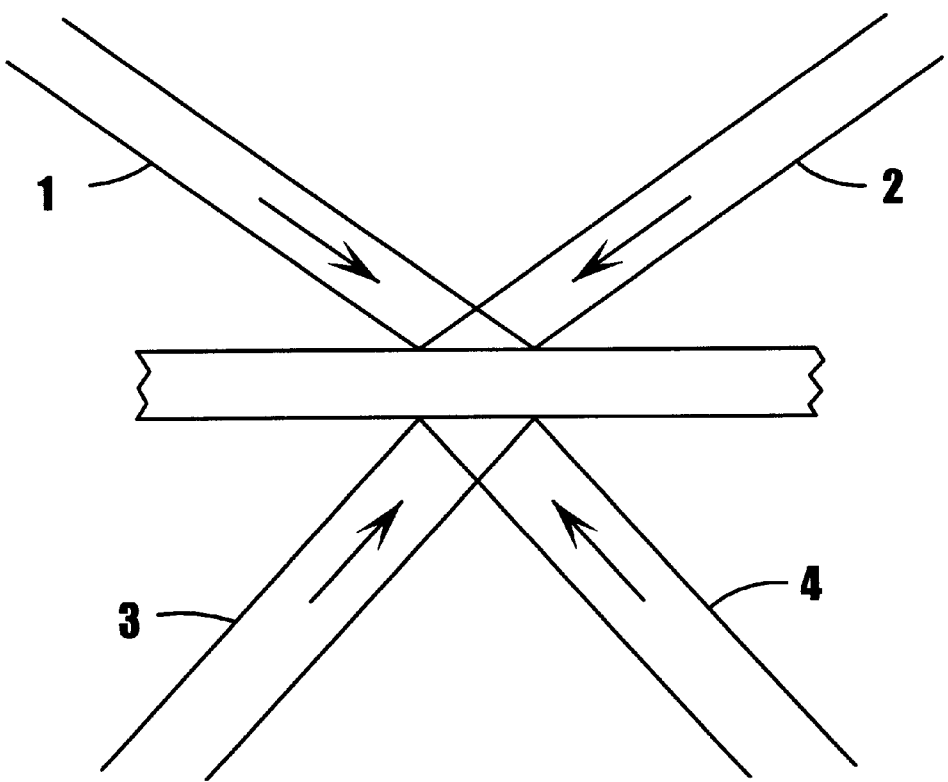
FIG. 11A is a schematic illustration of a four-beam overlay arrangement; and 11B is an illustration of another alternative arrangement of laser beams in practice of the method of the invention.

By way of further example and with reference to FIG. 11A, four beams may be directed onto the same area of the film surface. The laser power is desirably equal on both sides of the film. The beams may be of equal power, e.g., % power 25, 25, 25 and 25, for beams 1, 2, 3 and 4, respectively. Alternatively, they may be of unequal power, e.g., % power 10, 40, 10 and 40, for beams 1, 2, 3 and 4, respectively. Such beam configurations may be used to produce two transmission gratings and four reflection gratings in the four-beam overlap area.

Figure 11B:
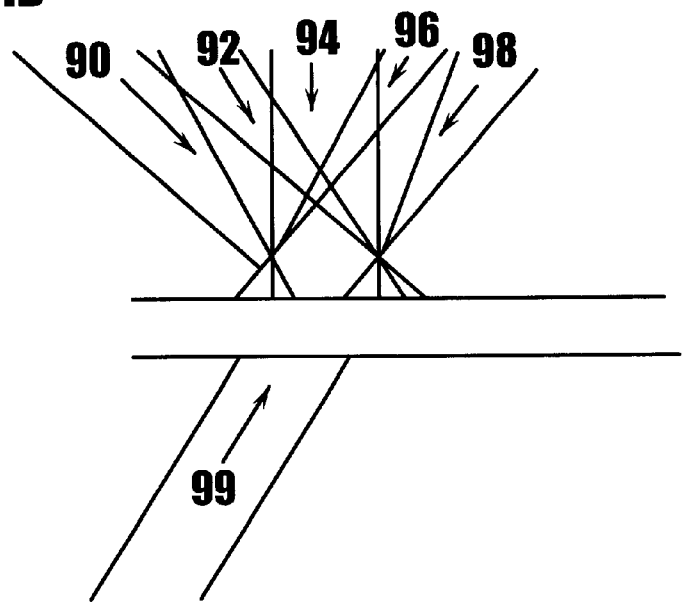

In another alternative embodiment, in order to obtain a broad viewing angle, multiple overlapping light beams of different incident angles may illuminate one side of the film. An additional expanded beam illuminates the film from the opposite side and is positioned to overlay the multiple overlapping light beams of different incident angles from the opposite side of the film (see, FIG. 11B). As in previous examples, the laser light power preferably is equal on both sides of the film. When the incident angles of the multiple overlapping laser beams differ only slightly, one may view the reflected image over a broad viewing angle. This method produces a spectrally and spatially overlapping display, such as that shown in FIG. 2B. Multiple non-overlapping beams used in conjunction with a single opposing beam also are within the scope of the invention.

This method produces films having both transmission and reflectance gratings superimposed in a common region. While this may be desirable for some applications, in other embodiments of the invention it may be desirable to write a plurality of reflection gratings onto the film without formation of a transmission grating. This may be accomplished by use of the previously described shuttering methodology, as follows.

Thus, in preferred embodiments one of the laser beam pairs may be shuttered to allow exposure and photopolymerization of the remaining beam pairs. After a short time, i.e., several seconds, the shutter is opened and the film is fully illuminated to complete photocuring. The resultant film possesses two reflection gratings, but does not exhibit any diffraction of light, as would be expected with the presence of a transmission grating.

While not bound by any mode of operation, it is hypothesized that the resultant film possesses reflection gratings arranged as is shown in FIG. 2C. It is hypothesized that the longer exposure time of the first exposed color angle laser beam pairs allow the photopolymerization to take place immediately at the surface of the film. The late arriving (shuttered) color angle laser finds the surface already depleted of monomer and it is capable of photopolymerization only deeper within the body of the film. This results in an H-PDLC device having the structure shown in FIG. 2C.

The devices of the present invention have many uses. Multiple color reflectance devices may be used in display applications. Broadband reflectance permits their use in switchable reflective mirrors, which may be used in windows, for example, for selective transmission and reflectance of the full visible spectrum and/or near infrared or UV spectral region. Multiple grating devices may also find applications as wave guides and beam shapers and in applications where multiple functionality of a single film is needed.

The invention is described in the following examples which are presented for the purpose of illustration and which are not limiting of the invention.

EXAMPLE 1

This example describes the preparation of a two-holographic element reflective H-PDLC display.

The pre-polymer used in the H-PDLC formation was prepared from commercially available constituents. The monomer was a mixture of multi-functional acrylates, such as Ebecryl 8301, 4883 and 4866 (UCB Radcure). Nematic liquid crystals, such as those available under the tradename E7 or BL038 from EM Industries may be used. A photoinitiator sensitive to the laser wavelength used in photopolymerization was used to sensitize the monomer to light. Relative proportions of materials were 50 wt % monomer, 35 wt % LC and 15 wt % initiator. An argon laser ($\lambda$=514 nm) with an Etalon adapter was used. For an argon laser, Rose Bengal is a suitable photoinitiator. N-Phenylglycine was used as a co-initiator and 1-vinyl-2-pyrrolidone was also included to improve the optical properties of the device. All materials are available from Sigma-Aldrich, Inc. The prepolymer was prepared under darkroom conditions, as exposure to ambient light may result in unwanted polymerization. Sample cells were prepared by drop-filling the prepolymer between two 2"×2" (5 cm×5 cm) ITO-coated glass substrates. Glass fiber spacers (EM Industries, 5 $\mu$m) were used to control the cell gap.

The mask was a 30 mm×30 mm aluminized glass grid having 5 mm square holes. Illumination angles were selected for the desired reflectance wavelength. Generally, blue light is obtained at an angle of 0° and green light is obtained at an angle of 5–10°, all relative to surface normal. The above illumination angles reflect anticipated changes in the resultant grating due to polymer shrinkage and the increase in the average refractive index of the polymer over time. Exposure time was about 20–30 seconds.

Figure 12:
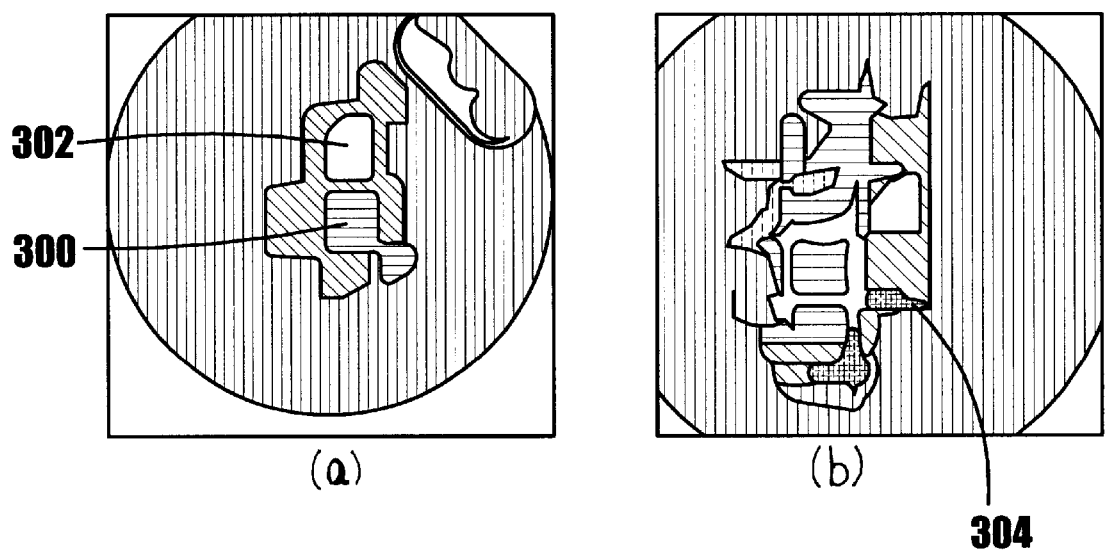
FIGS. 12(a), 12(b) is a color photograph of a blue-green holographic element reflective H-PDLC.

The resultant H-PDLC is shown in FIG. 12 having blue holographic elements 300 and green holographic elements 302. A small transmission grating area 304 also developed in the regions between adjacent holographic elements, which is due to poor mask alignment. Transmission area appeared to be of the similar type of grating created in the three-beam procedure described above. Careful mask alignment eliminated the transmission region. See, Example 2.

Reflectance spectra showed sharply defined reflectance of less than 20 nm FWHM. In addition, the spectral intensity of the two peaks were comparable indicating that reflection gratings were of comparable quality. This is in comparison to multiple reflection grating samples prepared by sequential exposure to light of different incident angles where subsequently exposed regions produced poor quality gratings.

Figure 13:
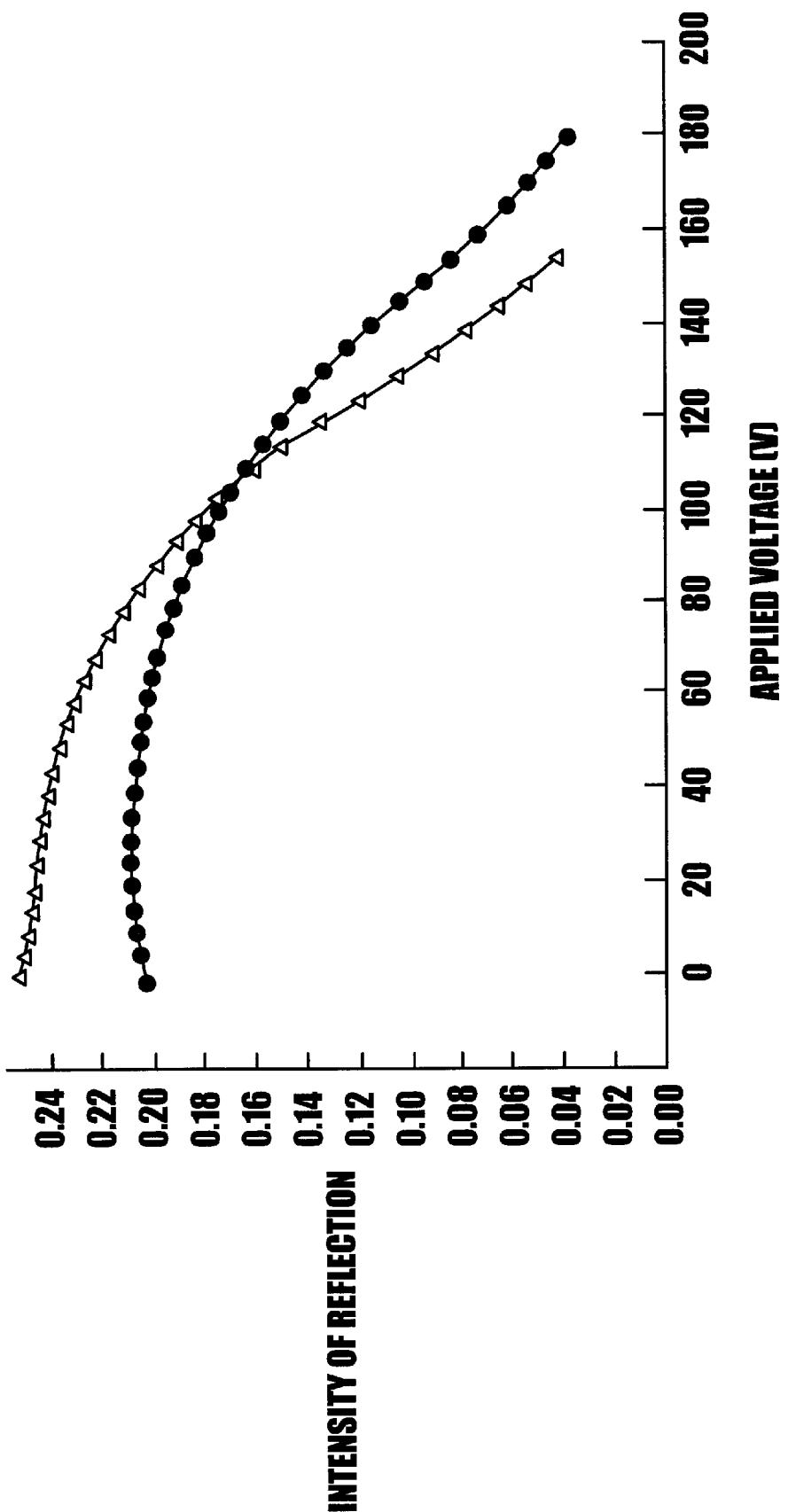
FIG. 13 is a voltage response curve for the blue-green holographic element H-PDLC of Example 1.

FIG. 13 shows the voltage response curves for each of the blue and green reflecting regions of the film. The voltage response is comparable to a non-pixelated sample, i.e., a sample in which film regions contain more than one reflection grating, indicating that the color of reflection and size of reflection domains does not effect the switching field. In addition, the device demonstrated a gradual decrease in reflection intensity, thus demonstrating gray-scale ability.

EXAMPLE 2

This example describes the preparation of a three-holographic element reflective H-PDLC display.

This procedure was carried out as described in Example 1, except that the laser beam was split into six beams, with each beam containing one-sixth the power of the original laser. Three beam pairs were used to illuminate the sample to obtain three different color holographic elements in a single exposure. Holographic element size for this example was reduced to 3 mm×3 mm. Illumination angles were selected for the desired reflectance wavelength. Generally, blue light is obtained at an angle of 0°; green light is obtained at an angle of 5–10°; and red light is obtained at an angle of 60° (when polymer shrinkage and increase in the average refractive index of the polymer over time is taken into account), all relative to surface normal. Exposure time was about 20–30 seconds.

Figure 14:
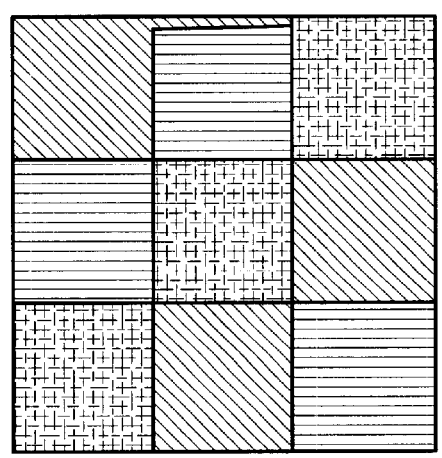
FIG. 14 is a color photograph of a three-color RGB holographic element reflective H-PDLC

The resultant three-color RGB holographic element H-PDLC is shown in FIG. 14. Careful mask alignment eliminated the transmission region observed in the sample of Example 1.

EXAMPLE 3

This example describes the use of shuttering (temporal multiplexing) to improve the quality of a pixillated sample, i.e., each holographic element includes a single reflection grating.

This procedure was carried out using the apparatus and material described in Example 2, except that a switchable shutter was placed between the laser source and the film to switchably block red angle laser beam, i.e., the laser beam incident at an angle that produces a red reflection grating. Exposure time was about 20–30 seconds; however, during the first 2 seconds of exposure, the laser beam pair used to write the red reflectance grating into the film was covered. After two seconds, the shutters were opened and exposure was completed with all three laser beam pairs.

Figure 15:
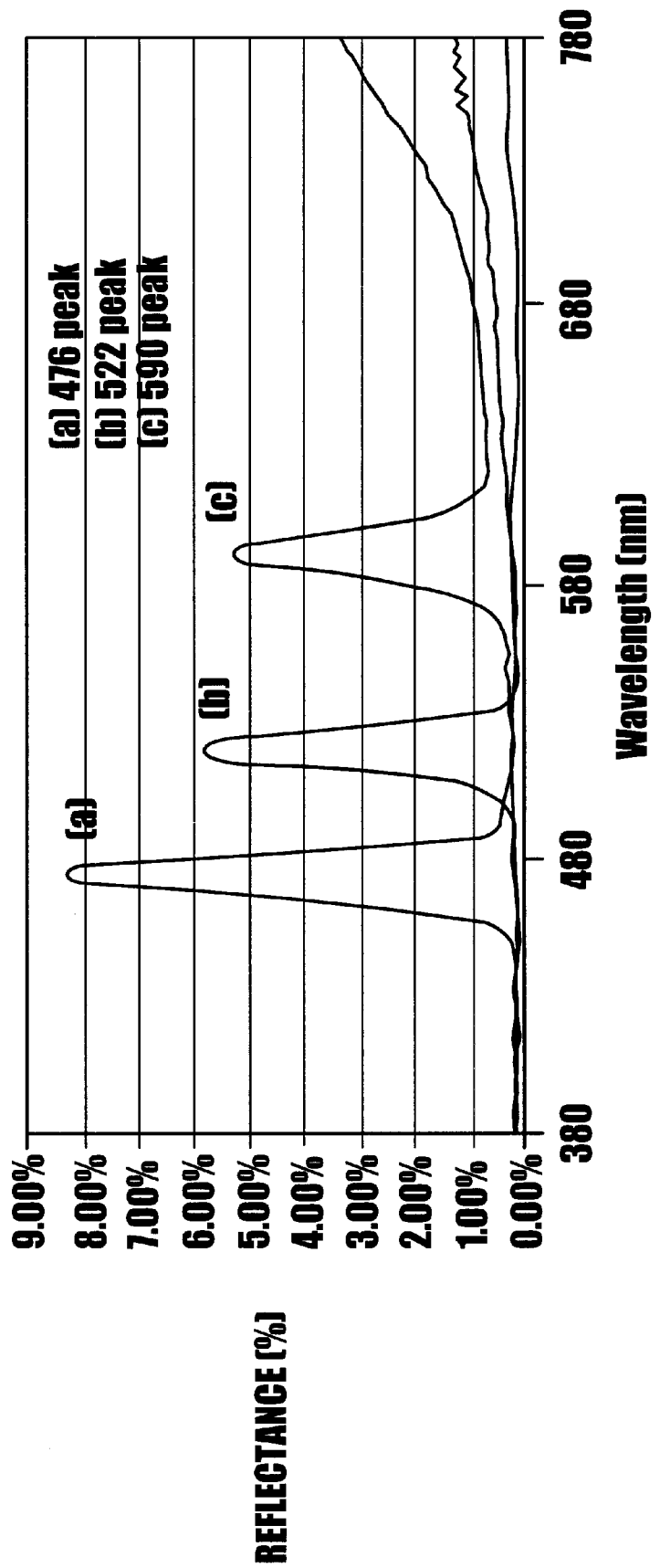
FIG. 15 is a graph of reflectance vs. wavelength which illustrates spectral reflectance of substantially equal intensity from a three holographic element sample.

In Example 2, the red reflecting regions were less intense than the blue and green reflecting regions. Use of a shutter to delay exposure of the film to the beams writing the red grating resulted in a sample having more equal reflectance from all three gratings. The reflectance spectrum from the resultant three color sample is shown in FIG. 15. All three colors are resolved (non-overlapping) and have normal peak shape and relatively equal reflectance levels.

EXAMPLE 4

This example describes the use of shuttering (temporal multiplexing) to produce a spatially overlapping reflectance pattern in a film, i.e., each holographic element includes more than one reflection grating, without the formation of a transmission grating.

This procedure was carried out using the materials and apparatus described in Example 1, except that no shadow masks were used. An argon laser ($\lambda$=514 nm) with an Etalon adapter was used. The apparatus was arranged to produce two pairs of beams incident on the sample. One beam pair was set for a "blue" angle and the other was set for a "green" angle. The two colors were chosen to provide reflectance spectra which were fairly close to one another so that they produced overlapping peaks.

The sample was first quickly exposed to a single beam pair (e.g., 1–2 sec), followed by exposure to both beam pairs for the duration of the exposure (30 sec). Experiments were conducted in which either the green or the blue angle beams were exposed first. Exposure to the green angle beams for one second followed by 29 seconds of combined blue and green angle beam exposure produced equally reflecting blue and green reflection gratings into the same overlapping region of the film, without the formation of a transmission grating.

Figure 16:
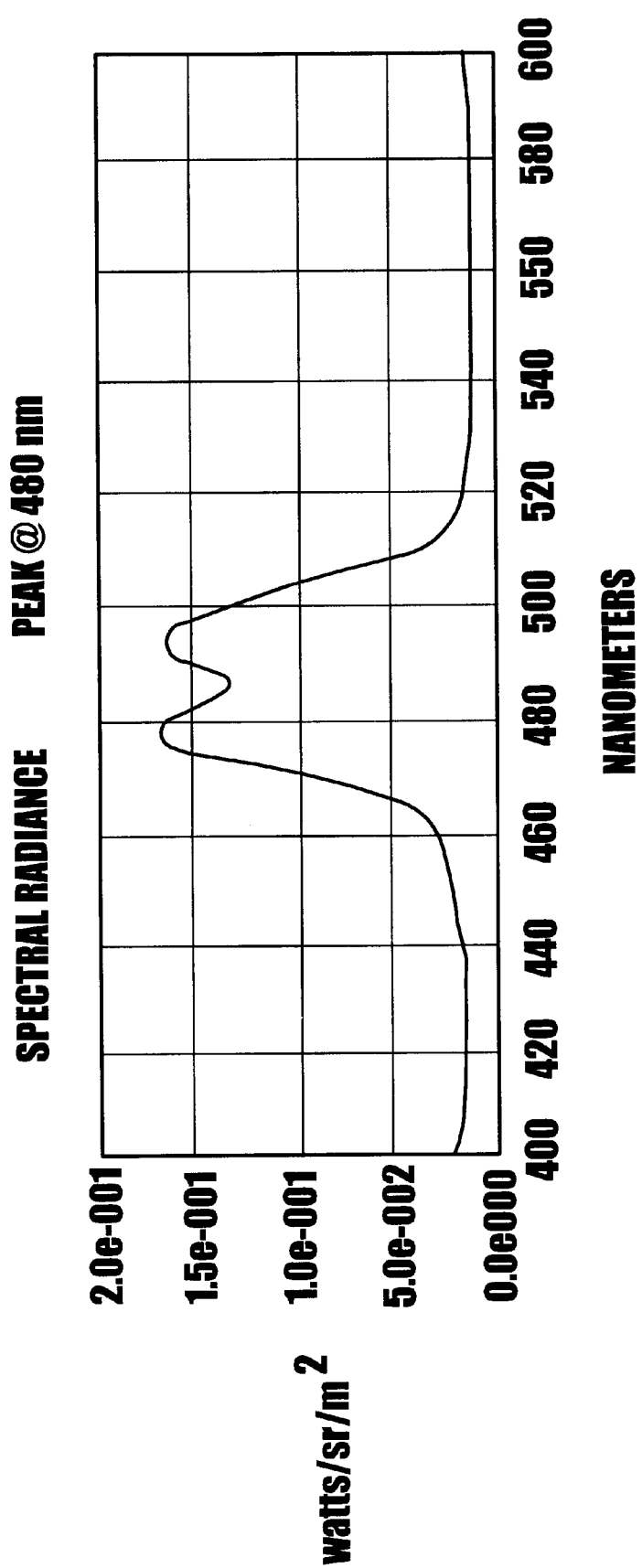
FIG. 16 is a graph of reflection efficiency vs. wavelength which illustrates peak broadening for a temporally exposed blue-green sample.

The resulting spectra, normalized to a mirror reflection, are shown in FIG. 16. The two coincident peaks can be plainly observed.

Figure 17:
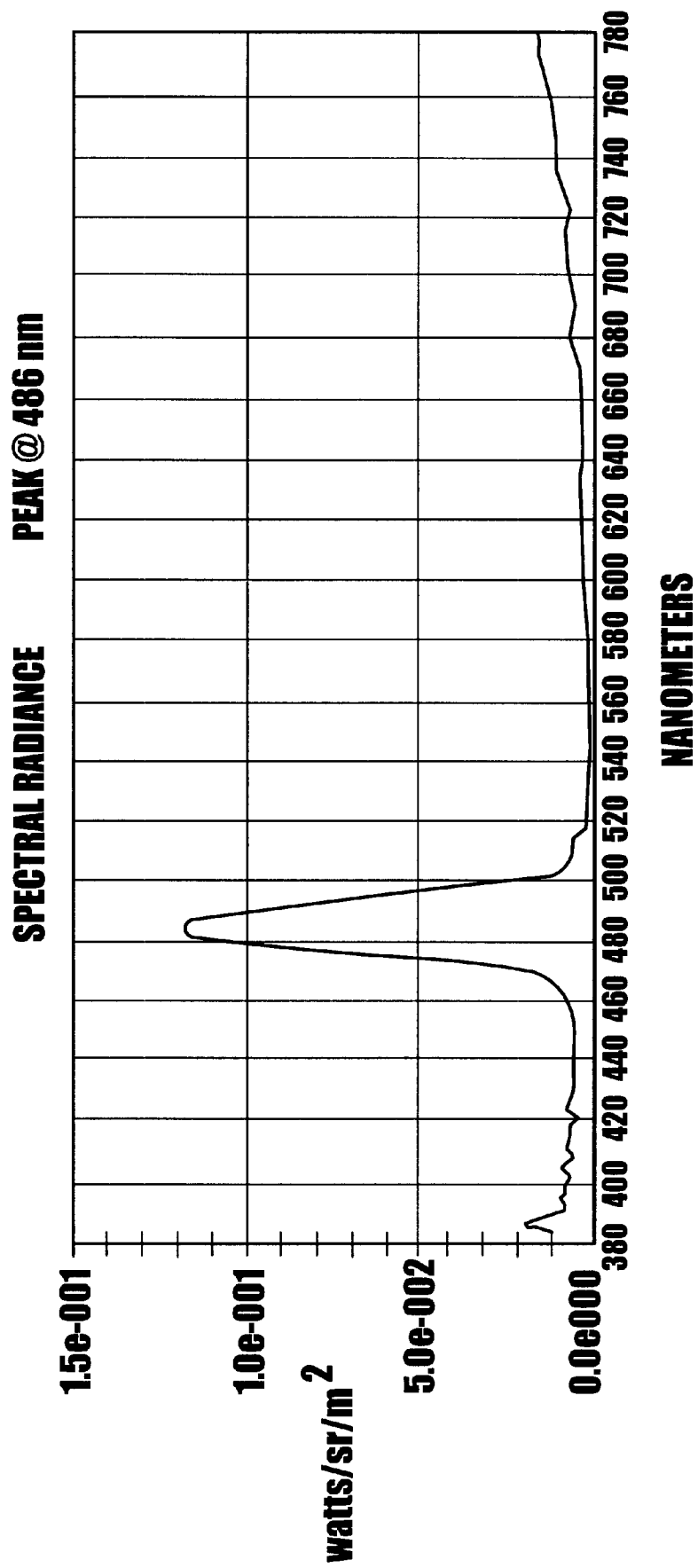
FIG. 17 is a graph of reflection efficiency vs. wavelength which illustrates peak broadening for a temporally exposed blue-green sample.

In an alternative experiment, the beam pairs used were of much closer color angles which produced reflectance gratings having much closer reflectance peaks, resulting in a widening of the reflectance peaks. This phenomenon is shown in FIG. 17 in which the two peaks have overlapped to form a single wide peak centered at 486 nm. Widening of the spectral reflectance peak is desired for applications requiring either broadband reflectance or wider viewing angles.

EXAMPLE 5

This example describes the preparation of a multigrating H-PDLC having spatially overlapping reflection and transmission gratings.

This procedure was carried out using the apparatus and material described in Example 1, except that the laser beam was split into three beams, with one beam containing one-half the power of the total incident power and the other two at one-fourth the power of the original beam and no shadow masks were employed. Three beams were used to illuminate the sample in a set-up similar to that shown in FIG. 9. Exposure time was about 20–30 seconds. A multiple grating structure having both reflection and transmission gratings was obtained.

The reflection characteristics of the sample were explored by spectrophotometry. FIG. 18 shows the reflection spectra from different regions of the film. FIGS. 18A and 18B show strong reflectance in the regions illuminated by two beam holographic light. As expected, reflection is maximized at different wavelengths due to the different angles of incident light in the two regions. Interestingly, the resultant multi-grating structure possessed multiple reflection gratings as well as a transmission grating in the area of three-beam illumination. The three beam area showed reflectance maximized at two different wavelengths, as is shown in FIGS. 18C and 18D, indicating that it is possible to write two different reflection gratings onto the same region of a film. See, FIG. 2B.

EXAMPLE 6

This example describes the preparation of a infrared reflecting grating in a polymer film.

The pre-polymer used in the H-PDLC formation was prepared from commercially available constituents, as described in Example 1. An argon laser ($\lambda$=514 nm) with an Etalon adapter was used. For an argon laser, Rose Bengal is a suitable photoinitiator.

The apparatus was set up as shown in FIG. 8. A 45° right angle prism was used as the top prism. The optical prism/mirror/prism stack was selected to provide a 14° angle of reflection off the mirror. The sample was exposed for 20–30 seconds, during which time the beam entered the prism, was bent down through the sample and reflected back out at 14° from its original incident path. The reflected beam thereby combines with the incident beam to create an interference pattern on the sample to obtain the infrared Bragg reflector.

An H-PDLC prepolymer film was positioned at 4 cm from the fixed Bragg mirror and illuminated for 20–30 seconds. The resultant film possessed Bragg reflection planes and reflected at about 500 nm.

A second H-PDLC prepolymer film was positioned at 10 cm from the fixed Bragg mirror and illuminated for 20–30 seconds. The resultant film possessed Bragg reflection planes and reflected at about 900 nm. Observation of the films by microscopy clearly showed Bragg planes which are spaced twice as far apart as those for the Bragg reflector to 500 nm. This demonstrates the viability of this technique for producing H-PDLC Bragg reflectors deep into the infrared spectrum.

What is claimed is:

1. A method of making a holographic polymer dispersed liquid crystal (H-PDLC) optical device, comprising:

providing a film comprised of a mixture of a liquid crystal and a photopolymerizable monomer between opposing substrates;

splitting a beam of laser energy from a laser energy source into a plurality of laser beams; and directing said plurality of beams onto the sample to form a plurality of interference patterns capable of providing different liquid crystal gratings in the film;

placing a mask between each of said laser energy beams and said film, each said mask forming a pattern of light and dark regions on said film and each said mask positioned such that at least one light region of a first beam pair coincides with at least one dark region of a second beam pair within the film; and illuminating the film whereby photo-polymerization of the monomer takes place and formation of holographic elements having different liquid crystal spacing occurs.

2. The method of claim 1, wherein said mask is of a pattern having transparent and opaque regions.

3. The method of claim 1, wherein two beam pairs are used and a film comprising reflection gratings of two different wavelengths is obtained.

4. The method of claim 1, wherein at least three beams pairs are used and a film comprising reflection gratings of at least three different wavelengths is obtained.

5. The method of claim 1, wherein the method provides spectrally non-overlapping holographic elements.

6. The method of claim 1, wherein the method provides spectrally overlapping holographic elements.

7. The method of claim 1, wherein the method provides spatially non-overlapping holographic elements.

8. An apparatus for preparation of a holographic polymer dispersed liquid crystal (H-PDLC) optical device, comprising:

means for supporting a film comprised of a mixture of liquid crystal and a photo-polymerizable monomer;

a laser source;

means for producing at least two pairs of laser light beams from said laser source, each said beam pair capable of directing light onto a film housed in the supporting means at a different angle to form an optical interference pattern within a film associated with reflection of a different wavelength of energy; and a mask disposed between each said laser light beams and supporting means, each said mask forming a pattern of light and dark regions on a film housed in the supporting means and each said mask positioned such that at least one light region of said first beam pair coincides with at least one dark region of said second beam pair within said film.

9. The apparatus of claim 8, further comprising:

switchable shutters disposed between a laser beam pair and the film to block light of a beam pair from illuminating said film.

10. The apparatus of claim 8, wherein the mask is of a pattern having transparent and opaque regions.

11. The apparatus of claim 8, further comprising at least one prism optically coupled with a surface of the film.

* * * * *